US010558296B2

(12) United States Patent
De Araujo et al.

(10) Patent No.: US 10,558,296 B2
(45) Date of Patent: Feb. 11, 2020

(54) HAND SENSING CONTROLLER

(71) Applicant: Tactual Labs Co., New York, NY (US)

(72) Inventors: Bruno Rodrigues De Araujo, Toronto (CA); David Holman, Toronto (CA); Ricardo Jorge Jota Costa, Toronto (CA); Braon Moseley, Round Rock, TX (US)

(73) Assignee: Tactual Labs Co., New York, NY (US)

( * ) Notice: Subject to any disclaimer, the term of this patent is extended or adjusted under 35 U.S.C. 154(b) by 0 days.

(21) Appl. No.: 16/511,845

(22) Filed: Jul. 15, 2019

(65) Prior Publication Data

US 2019/0339810 A1 Nov. 7, 2019

Related U.S. Application Data

(62) Division of application No. 15/924,782, filed on Mar. 19, 2018, now Pat. No. 10,353,515.

(60) Provisional application No. 62/473,908, filed on Mar. 20, 2017.

(51) Int. Cl.
*G09G 1/00* (2006.01)
*G06F 3/041* (2006.01)
*G06K 9/00* (2006.01)
*G06F 3/044* (2006.01)
*G06F 3/0346* (2013.01)
*G06F 3/01* (2006.01)

(52) U.S. Cl.
CPC ............ *G06F 3/0416* (2013.01); *G06F 3/017* (2013.01); *G06F 3/0346* (2013.01); *G06F 3/044* (2013.01); *G06K 9/00375* (2013.01); *G06F 2203/04101* (2013.01); *G06F 2203/04104* (2013.01); *G06F 2203/04107* (2013.01); *G06F 2203/04808* (2013.01)

(58) Field of Classification Search
CPC .. G09G 1/00; G06K 9/00; G06F 3/041; G06F 3/01; G06F 3/044; G06F 3/0416; G06F 3/0346
See application file for complete search history.

(56) References Cited

U.S. PATENT DOCUMENTS

2014/0071056 A1* 3/2014 Liu ........................ G06F 1/1626
345/169

* cited by examiner

*Primary Examiner* — Michael A Faragalla
(74) *Attorney, Agent, or Firm* — Adam B. Landa

(57) ABSTRACT

Disclosed is a touch-sensitive controller system employing a controller comprising a plurality of separate FMT sensor patterns adapted to detect a variety positions of the human hand. The controller system outputs both touch events as well as data reflective of the hand interaction with the controller. The FMT sensors may be driven by a common signal generator, and can look at body-generate crosstalk to aid in understanding the position, orientation and grip of a hand on the controller. In an embodiment, signal injection can supplement FMT sensor data. Fusion among the data transmitted and received by the plurality of FMT sensors and additional injected signals may provide improved fidelity in both touch and hand modeling.

20 Claims, 31 Drawing Sheets

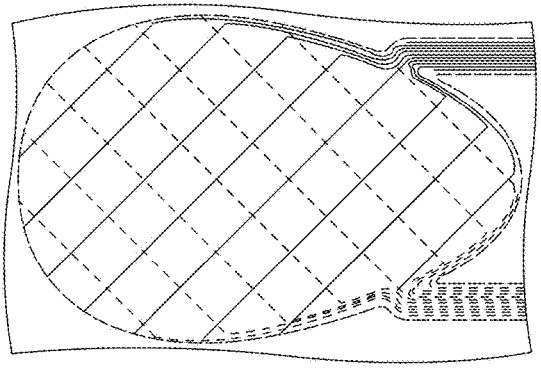
FIG. 3A
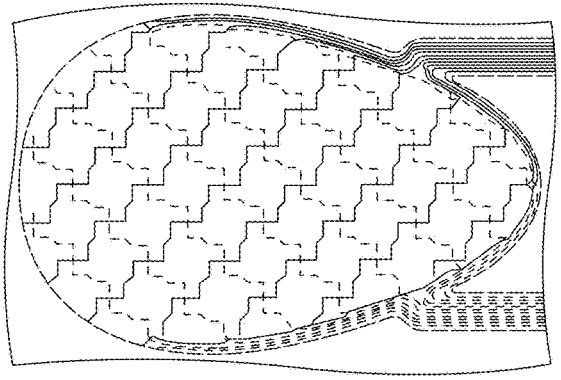
FIG. 3B
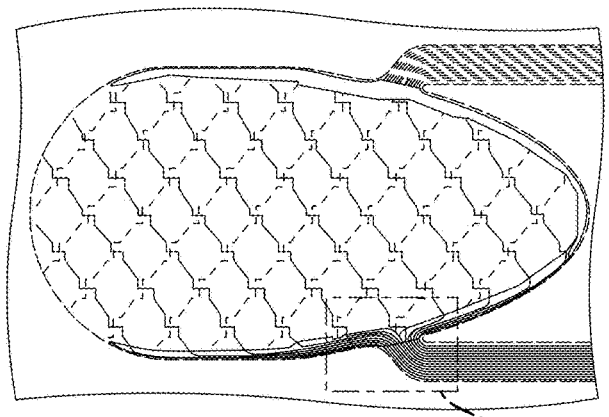
FIG. 3C  SEE FIG. 3E
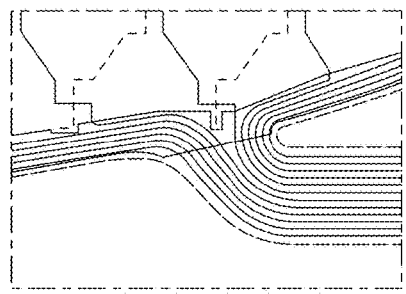
FIG. 3E
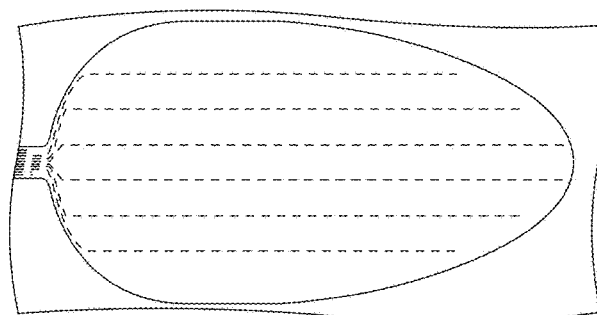
FIG. 3D

| TIMELINE | STATE | StopRequested | |
|---|---|---|---|
| | NOT_INIT | FALSE | |
| | | | init() |
| | INIT | FALSE | |
| | | | start() |
| | THRD_STARTING | FALSE | |
| | | | runLoop() starts |
| | THRD_STARTING | FALSE | |
| | | | startLoop() == true |
| | THRD_RUNNING | FALSE | |
| | | | stop() |
| | THRD_RUNNING | TRUE | |
| | | | runLoop() returns |
| | THRD_EXITED | FALSE | |
| | | | thread.join() returns |
| | INIT | FALSE | |
| | | | reset() |
| | NOT_INIT | FALSE | |

FIG. 15

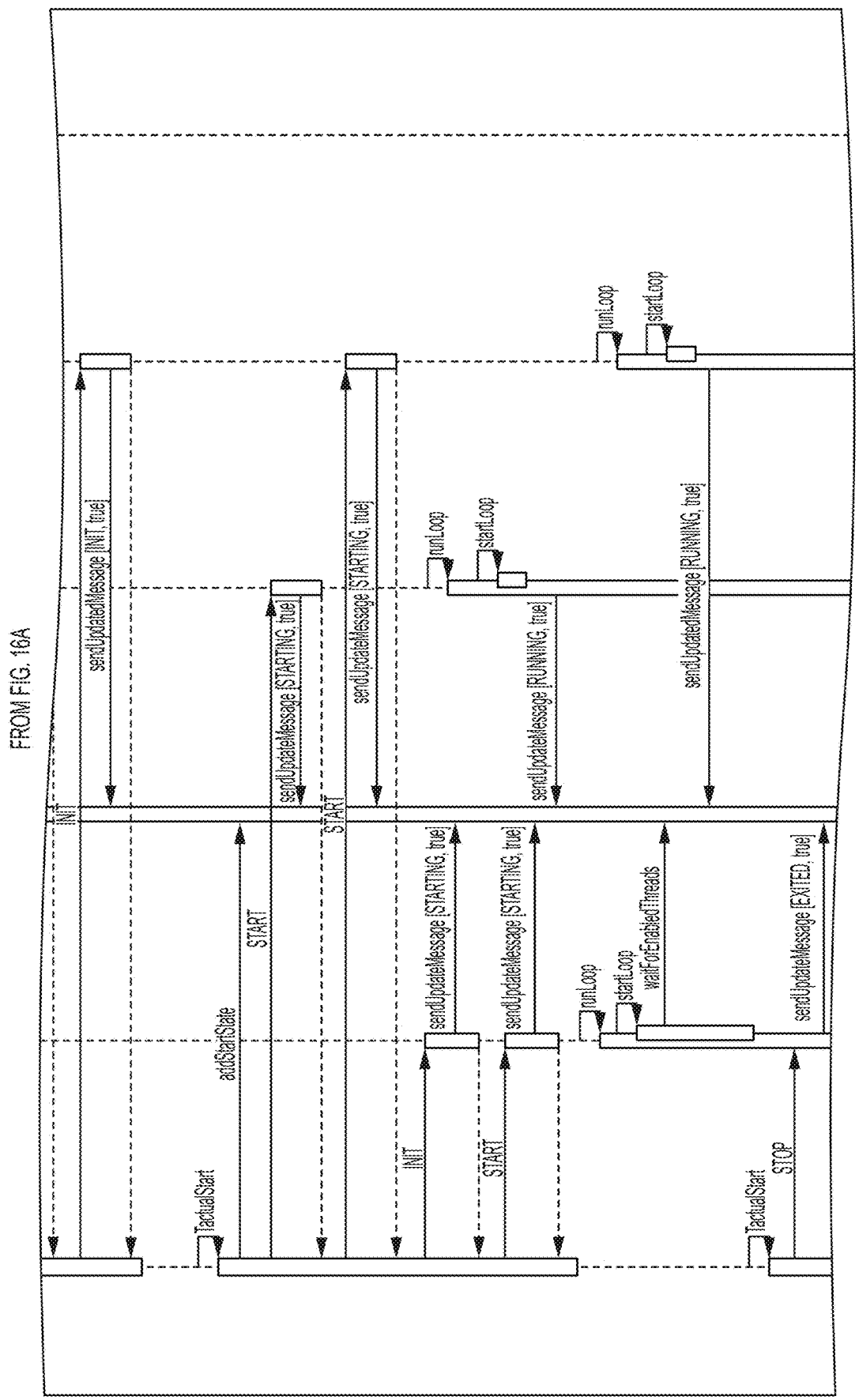

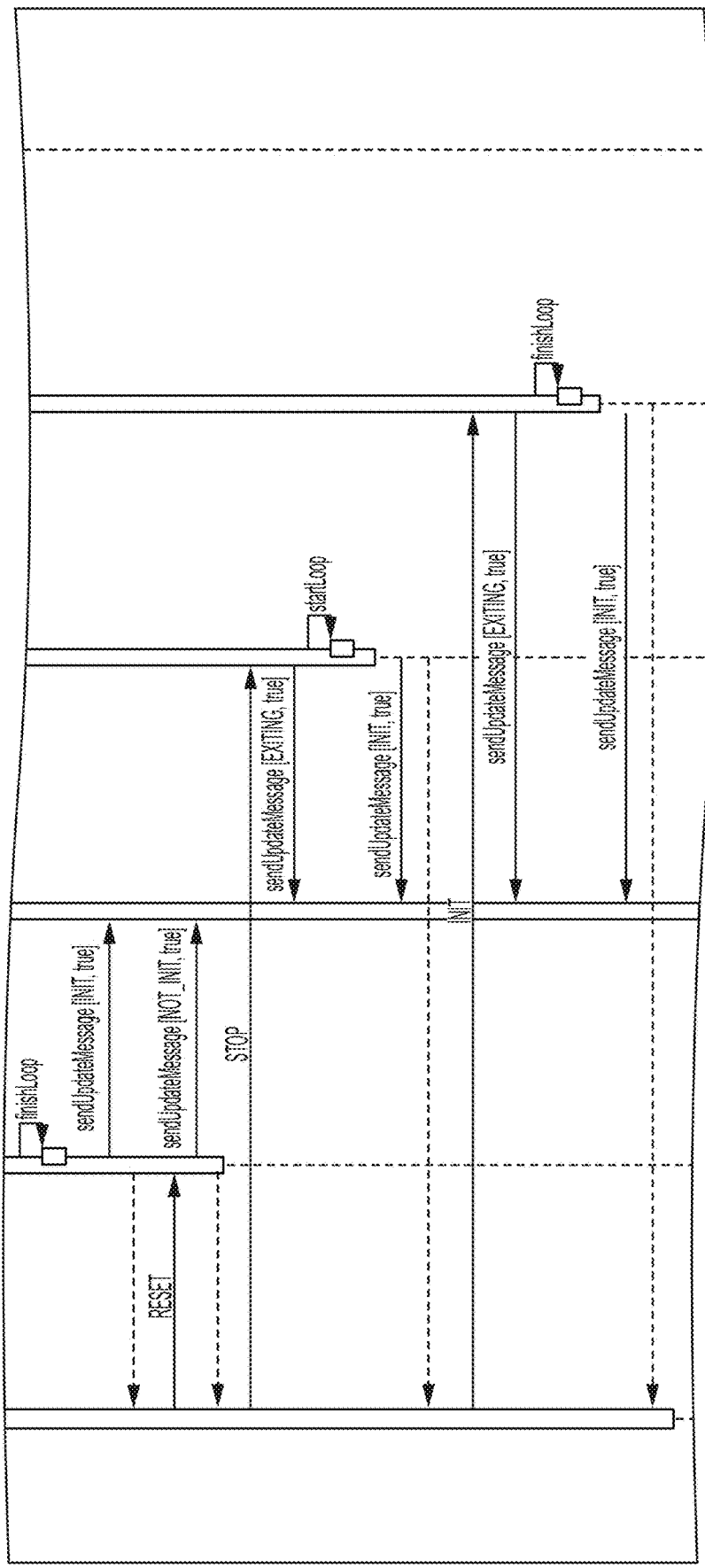

| BYTE OFFSET | 0x0 | 0x4 | 0x8 | 0xC |
|---|---|---|---|---|
| 0x000 | J0 X | J0 Y | J0 Z | J0 QX |
| 0x010 | J0 QY | J0 QZ | J0 QW | J1 X |
| 0x020 | J1 Y | J1 Z | J1 QX | J1 QY |
| 0x030 | J1 QZ | J1 QW | J2 X | J2 Y |
| ... | | | | |
| 0x1C0 | J16 X | J16 Y | J16 Z | J16 QX |
| 0x1D0 | J16 QY | J16 QZ | J16 QW | |

FIG. 25

```
struct TactualFingerInformation
{
        enum Handedness : int {NO_HAND=0, LEFT_HAND=1, RIGHT_HAND=2};
        unsigned int flags;
        float indexPresence;
        float middlePresence;
        float ringPresence;
        float pinkyPresence;
        float indexX;
        float indexY;
        float thumbX;
        float thumbY;
        float thumbDistance;
        int64_t timestamp;
        unsigned int frameNum;
        float skeletonPoses[119]; //17 bones * 7
        float localScale[3];
        Handedness handedness;
};
```

FIG. 26

RIGHT HAND, OPEN PALM

| BONE | x | y | z | qx | qy | qz | qw |
|---|---|---|---|---|---|---|---|
| J0 | 0.00000 | 0.00000 | 0.00000 | 0.00000 | 0.00000 | 0.00000 | 1.00000 |
| J1 | -0.09965 | 0.00000 | 0.00000 | -0.00002 | 0.00000 | 0.00000 | 1.00000 |
| J2 | -0.02722 | -0.01383 | -0.02653 | -0.63408 | -0.40848 | -0.29018 | 0.58897 |
| J3 | -0.06649 | 0.00001 | 0.00000 | 0.11298 | -0.05118 | 0.33763 | 0.93307 |
| J4 | -0.06167 | 0.00001 | 0.00000 | -0.04170 | 0.06167 | 0.61405 | 0.78575 |
| J5 | -0.14396 | -0.00001 | -0.04216 | 0.00000 | -0.03211 | 0.00000 | -0.99948 |
| J6 | -0.05578 | 0.00000 | 0.00000 | -0.00153 | 0.00000 | -0.04238 | -0.99910 |
| J7 | -0.03414 | 0.00000 | 0.00000 | 0.00000 | 0.00000 | 0.00000 | 1.00000 |
| J8 | -0.13855 | 0.00393 | -0.00795 | 0.00186 | 0.06796 | 0.05778 | 0.99601 |
| J9 | -0.06915 | 0.00000 | 0.00000 | 0.00000 | 0.00000 | 0.00000 | 1.00000 |
| J10 | -0.03668 | 0.00000 | 0.00000 | 0.00000 | 0.00000 | 0.00000 | 1.00000 |
| J11 | -0.13236 | 0.00224 | 0.02867 | 0.04582 | 0.09014 | 0.06059 | 0.99303 |
| J12 | -0.06012 | 0.00000 | 0.00000 | 0.00000 | 0.00000 | 0.00000 | 1.00000 |
| J13 | -0.03736 | 0.00000 | 0.00000 | 0.00000 | 0.00000 | 0.00000 | 1.00000 |
| J14 | -0.11450 | -0.00660 | 0.05840 | 0.00000 | 0.10506 | 0.00000 | 0.99447 |
| J15 | -0.04241 | 0.00000 | 0.00000 | -0.02516 | 0.00160 | 0.16394 | 0.98615 |
| J16 | -0.02935 | 0.00000 | 0.00000 | 0.00000 | 0.00000 | 0.00000 | 1.00000 |

FIG. 27

RIGHT HAND, GRASPING

| BONE | x | y | z | qx | qy | qz | qw |
|------|---|---|---|----|----|----|----|
| J0 | 0.00000 | 0.00000 | 0.00000 | 0.00000 | 0.00000 | 0.00000 | 1.00000 |
| J1 | -0.09965 | 0.00000 | 0.00000 | -0.00002 | 0.00000 | 0.00000 | 1.00000 |
| J2 | -0.02722 | -0.01383 | -0.02653 | -0.68840 | -0.31256 | -0.23396 | 0.61129 |
| J3 | -0.06649 | 0.00001 | 0.00000 | 0.11691 | -0.04141 | 0.25730 | 0.95834 |
| J4 | -0.06167 | 0.00001 | 0.00000 | -0.07037 | 0.02429 | 0.01934 | 0.99704 |
| J5 | -0.14396 | -0.00001 | -0.04216 | -0.00429 | -0.03182 | -0.13356 | -0.99052 |
| J6 | -0.05578 | 0.00000 | 0.00000 | -0.00134 | 0.00075 | -0.52951 | -0.84830 |
| J7 | -0.03414 | 0.00000 | 0.00000 | 0.00000 | 0.00000 | 0.18248 | 0.98321 |
| J8 | -0.13855 | 0.00393 | -0.00795 | 0.01320 | 0.06669 | 0.22351 | 0.97233 |
| J9 | -0.06915 | 0.00000 | 0.00000 | 0.00000 | 0.00000 | 0.47990 | 0.87732 |
| J10 | -0.03668 | 0.00000 | 0.00000 | 0.00000 | 0.00000 | 0.43675 | 0.89958 |
| J11 | -0.13236 | 0.00224 | 0.02867 | 0.06132 | 0.08041 | 0.23855 | 0.96585 |
| J12 | -0.06012 | 0.00000 | 0.00000 | 0.00000 | 0.00000 | 0.40974 | 0.91220 |
| J13 | -0.03736 | 0.00000 | 0.00000 | 0.00000 | 0.00000 | 0.47529 | 0.87983 |
| J14 | -0.11450 | -0.00660 | 0.05840 | 0.01563 | 0.10642 | 0.14444 | 0.98365 |
| J15 | -0.04241 | 0.00000 | 0.00000 | -0.02460 | 0.00548 | 0.31465 | 0.94887 |
| J16 | -0.02935 | 0.00000 | 0.00000 | 0.00000 | 0.00000 | 0.30318 | 0.95293 |

FIG. 28

HAND SENSING CONTROLLER

This application is a divisional of U.S. patent application Ser. No. 15/924,782 entitled "Hand Sensing Controller," filed Mar. 19, 2018, which claims the benefit of U.S. Provisional Application Ser. No. 62/473,908 entitled "Hand Sensing Controller," filed Mar. 20, 2017, the contents of each of which are hereby incorporated by reference. This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The disclosed apparatus and methods relate in general to the field of human-machine interface controllers, and in particular to a human-machine interface controller that is sensitive to touch, including, hover, grip and pressure.

BACKGROUND

In recent years multi-touch technologies have been developing. An avenue of development has surrounded the generation of a heatmap of touch based on capacitive interaction with a sensor using a simultaneous orthogonal signaling scheme. Numerous patent applications have been filed concerning interaction sensing using a sensor driven by a simultaneous orthogonal signaling scheme, including, without limitation, Applicant's prior U.S. patent application Ser. No. 13/841,436, filed on Mar. 15, 2013 entitled "Low-Latency Touch Sensitive Device" and U.S. patent application Ser. No. 14/069,609 filed on Nov. 1, 2013 entitled "Fast Multi-Touch Post Processing."

These systems and methods are generally directed to multi-touch sensing on planar sensors. Obtaining information to understand a user's touch, gestures and interactions with a handheld object introduces myriad possibilities, but because handheld objects come in myriad shapes, it can be difficult to incorporate capacitive touch sensors into handheld objects such as a controller, which sensors can thereby provide information relative to a user's gestures and other interactions with the handheld objects.

Generally, taxel (or row-column intersection) data is aggregated into heatmaps. These heatmaps are then post-processed to identify touch events, and the touch events are streamed to downstream processes that seek to understand touch interaction, including, without limitation, gestures, and the objects in which those gestures are performed.

What is needed are capacitive touch controllers that provide more detailed information relative to a user's gestures and other interactions with the controller.

What is needed are capacitive touch controller systems that can provide a hand model of a user's interaction with the controller.

BRIEF DESCRIPTION OF THE DRAWINGS

The foregoing and other objects, features, and advantages of the disclosure will be apparent from the following more particular description of embodiments as illustrated in the accompanying drawings, in which reference characters refer to the same parts throughout the various views. The drawings are not necessarily to scale, emphasis instead being placed upon illustrating principles of the disclosed embodiments.

FIG. 3A shows an illustrative embodiment of a sensor pattern for use in connection with the thumb-centric portion of a controller.
FIG. 3B shows another illustrative embodiment of a sensor pattern for use in connection with the thumb-centric portion of a controller.
FIG. 3C shows an illustrative embodiment of a three-layer sensor pattern for use in connection with the thumb-centric portion of a controller.
FIG. 3D shows an illustrative embodiment of a three-layer sensor pattern for use in connection with the thumb-centric portion of a controller.
FIG. 3E shows a close up view of the section shown in FIG. 3C.

FIG. 15 shows an illustration of the expected lifecycle of a GenericModule in the case where the thread is created successfully, and no errors occur during startLoop( ) or loop( ) in accordance with one embodiment of the invention.

FIG. 16B is a sequence diagram showing the order of calls in an embodiment of the present invention.

FIG. 16C is a sequence diagram showing the order of calls in an embodiment of the present invention.

FIG. 25 is a table reflecting representation of skeleton data as illustrated in FIG. 24, in accordance with one embodiment of the invention.

FIG. 26 shows an embodiment of a data structure that can be used to represent a user's finger information.

FIG. 27 is a table illustrating an embodiment of skeletonPoses for an exemplary right hand.

FIG. 28 is a table illustrating an embodiment of skeletonPoses for an exemplary right hand.

DETAILED DESCRIPTION

Figure 1A:
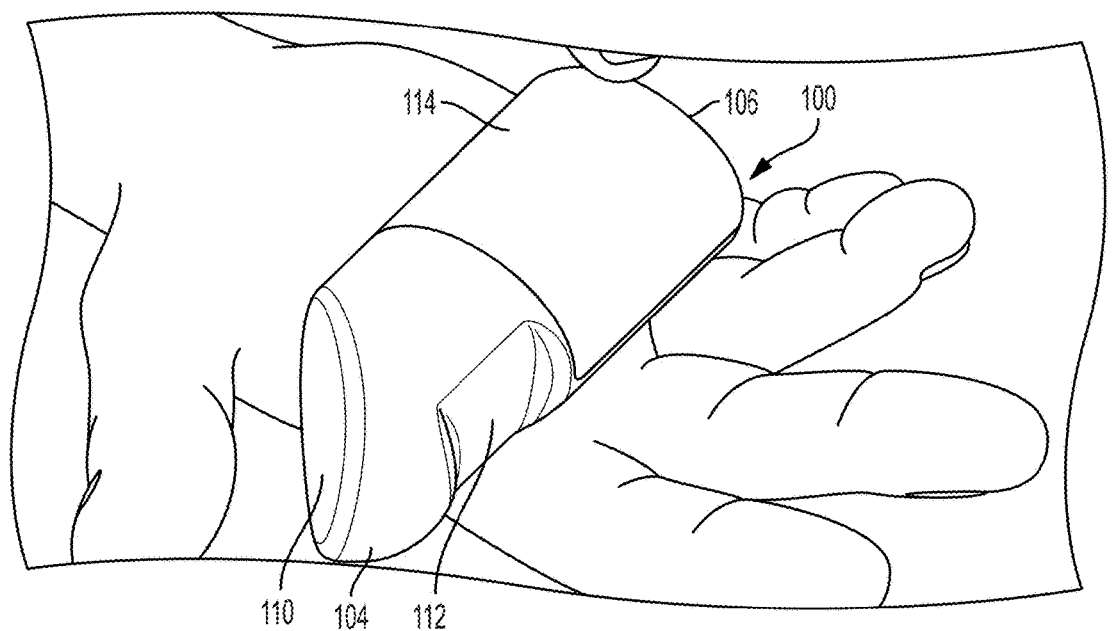
FIG. 1A shows an illustration of a view of an exemplary six-DOF controller incorporating capacitive sensor patterns.
Figure 1B:
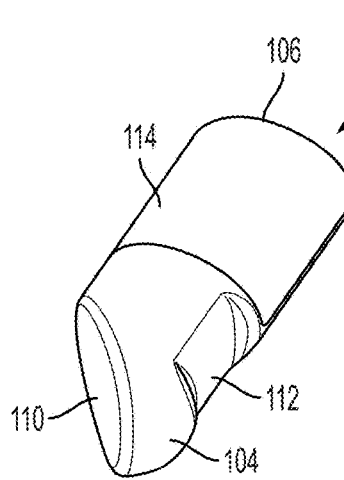
FIG. 1B shows an illustration of a view of an exemplary six-DOF controller incorporating capacitive sensor patterns.
Figure 1C:
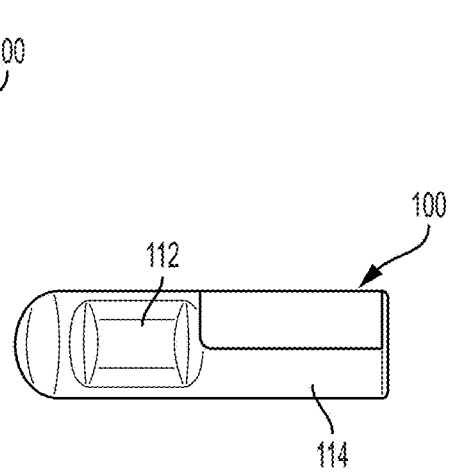
FIG. 1C shows an illustration of a view of an exemplary six-DOF controller incorporating capacitive sensor patterns.
Figure 1D:
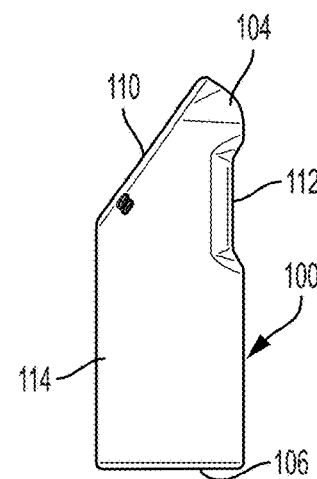
FIG. 1D shows an illustration of a view of an exemplary six-DOF controller incorporating capacitive sensor patterns.
Figure 1E:
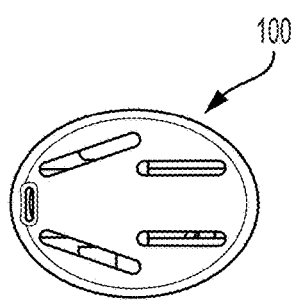
FIG. 1E shows an illustration of a view of an exemplary six-DOF controller incorporating capacitive sensor patterns.
Figure 1F:
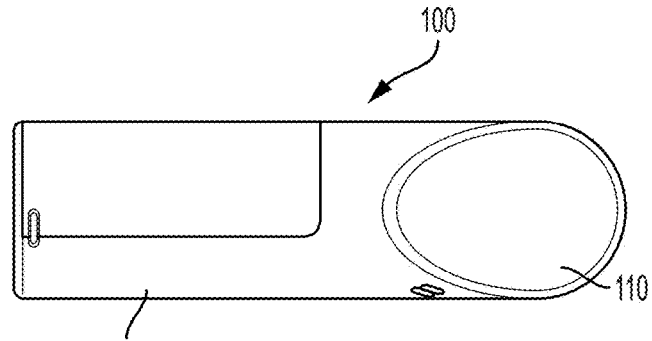
FIG. 1F shows an illustration of a view of an exemplary six-DOF controller incorporating capacitive sensor patterns.

This application relates to user interfaces such as the fast multi-touch sensors and other interfaces disclosed in U.S. patent application Ser. No. 15/251,859, filed Aug. 30, 2016 entitled "Touch-Sensitive Objects." The entire disclosure of that application, and the applications incorporated therein by reference, are incorporated herein by reference.

In various embodiments, the present disclosure is directed to hand sensing controllers, and methods for designing, manufacturing and operating sensing controllers (e.g., hand-sensing controllers and hand and touch sensing controllers), and in particular controllers using capacitive sensors to sense human interaction. Throughout this disclosure, various controller shapes and sensor patterns are used for illustrative purposes. Although example compositions and/or geometries are disclosed for the purpose of illustrating the invention, other compositions and geometries will be apparent to a person of skill in the art, in view of this disclosure, without departing from the scope and spirit of the disclosure herein.

Throughout this disclosure, the terms "hover," "touch," "touches," "contact," "contacts," "pressure," "pressures" or other descriptors may be used to describe events or periods of time in which a human-machine interaction takes place—i.e., a user's finger, a stylus, an object or a body part is detected by the sensor. In some embodiments, and as generally denoted by the word "contact," these detections occur as a result of physical contact with a sensor, or a device in which it is embodied. In other embodiments, and as sometimes generally referred to by the term "hover," the sensor may be tuned to allow the detection of "touches" that are hovering at a distance above the touch surface or otherwise separated from the touch sensitive device. As used herein, "touch surface" may not have actual features, and could be a generally feature-sparse surface. The use of language within this description that implies reliance upon sensed physical contact should not be taken to mean that the techniques described apply only to those embodiments; indeed, generally, what is described herein applies equally to "contact" and "hover", each of which being a "touch". More generally, as used herein, the term "touch" refers to an act that can be detected by the types of sensors disclosed herein, thus, as used herein the term "hover" is one type of "touch" in the sense that "touch" is intended herein. "Pressure" refers to the force per unit area exerted by a user contact (e.g., presses their fingers or hand) against the surface of an object. The amount of "pressure" is similarly a measure of "contact," i.e., "touch." "Touch" refers to the states of "hover," "contact," "pressure" or "grip", whereas a lack of "touch" is generally identified by signals being below a threshold for accurate measurement by the sensor. Thus, as used herein, the phrase "touch event" and the word "touch" when used as a noun include a near touch and a near touch event, or any other gesture that can be identified using a sensor. In accordance with an embodiment, touch events may be detected, processed and supplied to downstream computational processes with very low latency, e.g., on the order of ten milliseconds or less, or on the order of less than one millisecond.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic. Thus, for example, a first and a second frequency, absent further limitation, could be the same frequency—e.g., the first frequency being 10 Mhz and the second frequency being 10 Mhz; or could be different frequencies—e.g., the first frequency being 10 Mhz and the second frequency being 11 Mhz. Context may dictate otherwise, for example, where a first and a second frequency are further limited to being orthogonal to each other in frequency, in which case, they could not be the same frequency.

In an embodiment, the disclosed fast multi-touch sensor utilizes a projected capacitive method that has been enhanced for high update rate and low latency measurements of touch events. The technique can use parallel hardware and higher frequency waveforms to gain the above advantages. Also disclosed are methods to make sensitive and robust measurements, which methods may be used on transparent display surfaces and which may permit economical manufacturing of products which employ the technique. In this regard, a "capacitive object" as used herein could be a finger, other part of the human body, a stylus, or any object to which the sensor is sensitive. The sensors and methods disclosed herein need not rely on capacitance. With respect to, e.g., the optical sensor, such embodiments utilize photon tunneling and leaking to sense a touch event, and a "capacitive" controller as used herein includes any object, such as a stylus or finger, that that is compatible with such sensing. Similarly, "touch locations" and "touch sensitive device" as used herein do not require actual touching contact between a capacitive controller and the disclosed sensor.

The term "controller" as used herein is intended to refer to a physical object that provides the function of human-machine interface. In an embodiment, the controller is handheld. In an embodiment, the handheld controller provides six degrees of freedom (e.g., up/down, left/right, forward/back, pitch, yaw, and roll), as counted separately from the sensed touch input described herein. In an embodiment, the controller may provide fewer than six degrees of freedom. In an embodiment, the controller may provide more degrees of freedom, as in a replica of the movement of a human hand which is generally considered to have 27 degrees of freedom. Throughout, the term "six-DOF controller" refers to embodiments in which the controller's position and orientation are tracked in space, rather than strictly counting the total number of degrees of freedom the controller is capable of tracking; that is, a controller will be called "six-DOF" regardless of whether additional degrees of freedom, such as touch tracking, button pushing, touchpad, or joystick input are possible. Further, we will use the term six-DOF to refer to controllers which may be tracked in fewer than six dimensions, such as for example a controller whose 3D position is tracked but not its roll/pitch/yaw, or a controller tracked only in two or one dimensions of movement but its orientation is tracked in 3 or perhaps fewer degrees of freedom.

FIGS. 1A-1F show illustrations of a variety of views of an exemplary six-DOF controller 100 incorporating capacitive sensor patterns. In an embodiment, a hand-strap 102, shown in FIG. 2, running from at or near the top 104 of the controller 100, to at or near the bottom 106 of the controller 100, is provided to facilitate utilization of the six-DOF controller 100. In an embodiment, the controller 100 has a thumb-centric portion 110 and a trigger-centric portion 112. In an embodiment, the controller 100 is designed to fit generally within the palm of a user's hand 105. In an embodiment, the controller 100 is designed in a manner that permits use in either the left or right hand. In an embodiment, specialized controllers 100 are used for each of the left and the right hand.

Capacitive sensor patterns are generally thought of as having rows and columns. As used herein, however, the terms row and column are not intended to refer to a square grid, but rather to a set of conductors upon which signal is transmitted (rows) and a set of conductors onto which signal may be coupled (columns). (The notion that signals are transmitted on rows and received on columns itself is arbitrary, and signals could as easily be transmitted on conductors arbitrarily designated columns and received on conductors arbitrarily named rows, or both could arbitrarily be named something else; further, the same conductor could act as both a transmitter and a receiver.) As will be discussed in more detail below, it is not necessary that the rows and columns form a grid; many shapes are possible as long as touch proximate to a row-column intersection increases or decreases coupling between the row and column.

Numerous capacitive sensor patterns have heretofore been proposed, see e.g., Applicant's prior U.S. patent application Ser. No. 15/099,179, filed on Apr. 14, 2016 entitled "Capacitive Sensor Patterns," the entire disclosure of that application, and the applications incorporated therein by reference, are incorporated herein by reference. In an embodiment. The controller 100 shown in FIGS. 1A-1F comprises a plurality of capacitive sensor patterns. In an embodiment two or more sensor patterns can be employed in a single controller. In an embodiment, three sensor patterns are employed in a single hand-held controller 100. In an embodiment as shown, one sensor pattern is employed for thumb-centric detection, another sensor pattern is employed for trigger-centric detection, and a yet another sensor pattern is employed for detection at other locations around the body of the controller.

The transmitters and receivers for all or any combination of the sensor patterns may be operatively connected to a single integrated circuit capable of transmitting and receiving the required signals. In an embodiment, where the capacity of the integrated circuit (i.e., the number of transmit and receive channels) and the requirements of the sensor patterns (i.e., the number of transmit and receive channels) permit, all of the transmitters and receivers for all of the multiple sensor patterns on a controller are operated by a common integrated circuit. In an embodiment, operating all of the transmitters and receivers for all of the multiple sensor patterns on a controller with a common integrated circuit may be more efficient than using multiple integrated circuits.

In an embodiment, the thumb-centric sensor is deployed on a relatively flat surface most near the thumb 103 as the controller 100 is held. The taxel density (i.e., the density of row-column intersections on a sensor pattern) may vary from sensor pattern to sensor pattern. In an embodiment, a sensor pattern is selected for the thumb-centric area with a relatively high taxel density such as between 3.5 mm and 7 mm. In an embodiment, the thumb-centric area is provided a taxel density of 5 mm to sufficiently improve fidelity to permit the sensed data to be used to accurately model the thumb 103. In an embodiment, the thumb-centric area is provided a taxel density of 3.5 mm to better improve fidelity.

In addition to the selection of taxel density, a sensor pattern can be selected based on its ability to detect far, near or mid hover, as opposed to contact. In an embodiment, the sensor pattern for the thumb-centric sensor is selected to detect hover up to between 3 mm to 10 mm. In an embodiment, the sensor pattern for the thumb-centric sensor is selected to detect hover to at least 3 mm. In an embodiment, the sensor pattern for the thumb-centric sensor is selected to detect hover to at least 4 mm. In an embodiment, the sensor pattern for the thumb-centric sensor is selected to detect hover to at least 5 mm. In an embodiment, the sensor pattern for the thumb-centric sensor is selected to detect hover to a distance that sufficiently to permit the sensed data to be used to accurately model the thumb 103 of a population of intended users.

Figure 2:
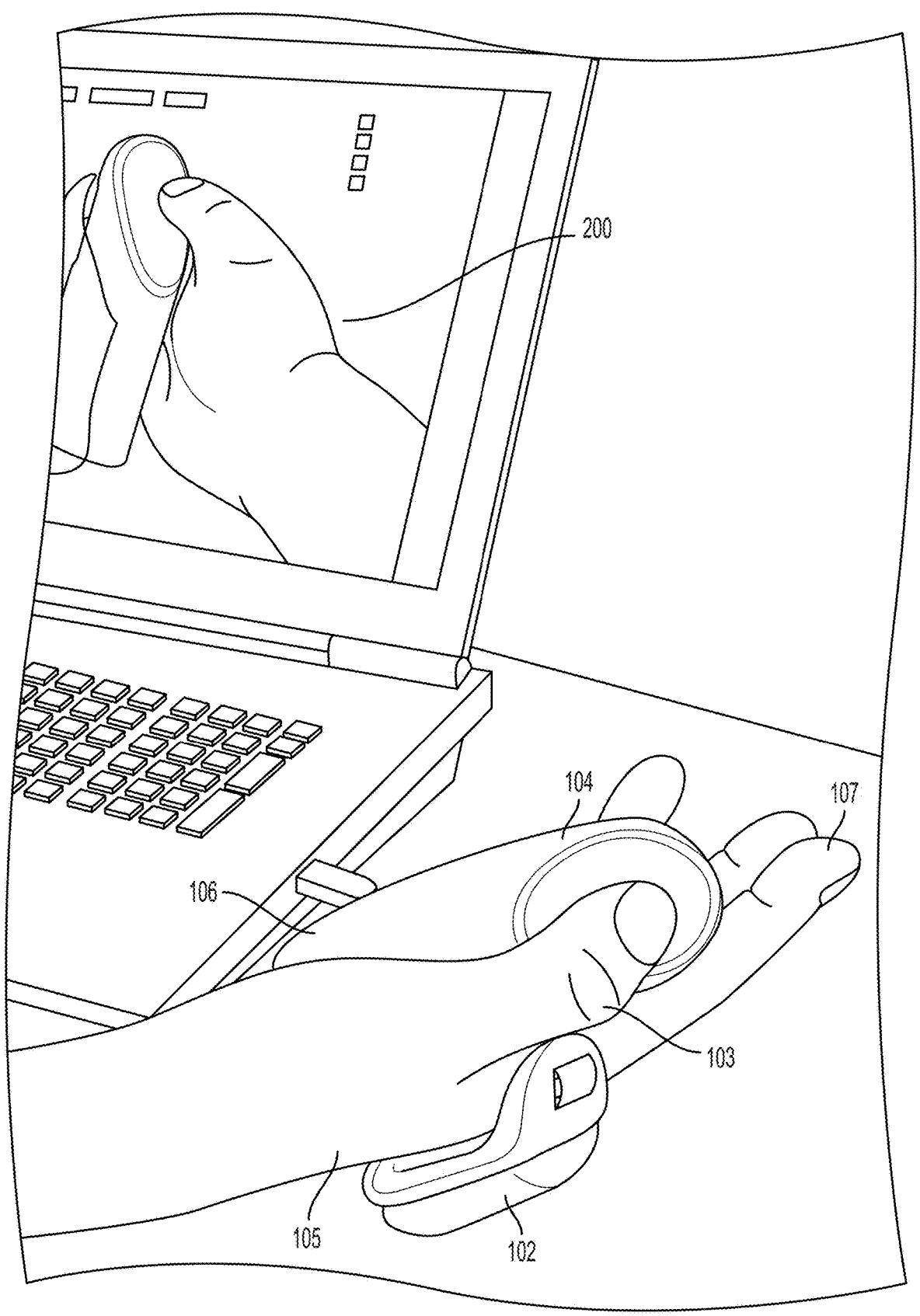
FIG. 2 illustrates an embodiment of a controller in the hand of a user is shown, with a computerized model of a heatmap detected based on interaction of the thumb with the thumb-centric portion of the controller.

Turning briefly to FIG. 2, a controller 100 in the hand 105 of a user is shown, as is a computerized model 200 of a heatmap detected based on interaction of the thumb 103 with the thumb-centric portion 110 of the controller 100. The heatmap depicts areas of touch across a rainbow-like spectrum, with red reflecting areas with more detected touch, and blue reflecting areas with less detected touch. The heatmap arbitrarily also locates the touch-indicative color-layer at a distance from the touch surface that corresponds with the amount of touch detected—where more detection results in the red being further away from the sensor in the computer-reflected model. As illustrated in FIG. 2, the thumb 103 of the hand of a user is either in contact with, or nearly in contact with the thumb-centric sensor pattern on the thumb-centric portion 110.

In an embodiment, the thumb-centric sensor pattern is a made up of a grid of rows and columns. In an embodiment, the row-column orientation of the thumb-centric sensor pattern is placed at an angle such that the rows and columns run diagonally across the face of the thumb-centric sensor pattern as it is oriented on the controller 100. In an embodiment, the rows, and the columns of the thumb-centric sensor pattern are placed at an angle with respect to their respective orientation on the controller 100 of approximately 30 degrees. In an embodiment, the rows, and the columns of the thumb-centric sensor pattern are placed at an angle with respect to their respective orientation on the controller 100 of approximately 60 degrees. In an embodiment, the thumb-centric sensor pattern is made of three layers, comprising two layers of receivers that run generally diagonally with respect to the thumb-centric portion 110 of the controller 100, and a third layer of transmitters that operate above, below or between the two layers of receivers, and are oriented either generally horizontally or generally vertically with respect to the thumb-centric portion 110 of the controller 100.

Turning now to FIGS. 3A-3D, three sensor patterns are illustratively shown which may be employed as a thumb-centric sensor pattern. While these specific examples have been found to provide acceptable results, it is within the scope and spirit of this disclosure, to use other sensor patterns as a thumb-centric sensor pattern in connection with the present invention. Many other sensor patterns will be apparent to a person of skill in the art for use as a thumb-centric sensor pattern in view of this disclosure.

The sensor pattern shown in FIG. 3A, where rows and columns (e.g., transmitting antenna and receiving antenna) are shown in solid and dashed lines, works adequately. The sensor pattern shown in FIG. 3B also shows rows and columns in solid and dashed lines. The sensor pattern in FIG. 3B additionally comprises decoupling lines that run near the feedlines. FIGS. 3C and 3D show layers of a three-layer sensor, the solid and dashed lines of FIG. 3C each representing a layer of the sensor, and the dashed lines of FIG. 3D representing another layer. In an embodiment, the solid and dashed lines of FIG. 3C are all used as columns (e.g., receiving antenna), and the dashed lines of FIG. 3D are used as transmitters. In an embodiment, the three-layer sensor provides high quality imaging for the purpose of the thumb-centric sensor pattern in a controller as discussed herein. The sensor pattern in FIG. 3C additionally comprises broader decoupling lines (which can be referred to as decoupling planes) that run near the feedlines. A partial detail of FIG. 3C is also provided for clarity (See FIG. 3E).

As a capacitive object such as a finger approaches the feedlines, smearing may result. In an embodiment, to mitigate the smearing, the feedlines can be moved either to a more remote location, e.g., by enlarging the thumb-centric sensor pattern area. In an embodiment, to mitigate the smearing, the feedlines can be directed away from the surface, and into the object. Each of these has drawbacks that will be apparent to a person of skill in the art. In an embodiment, to mitigate the smearing, decoupling lines as shown in FIG. 3B or broader decoupling planes as shown in FIG. 3C may be added.

Figure 4:
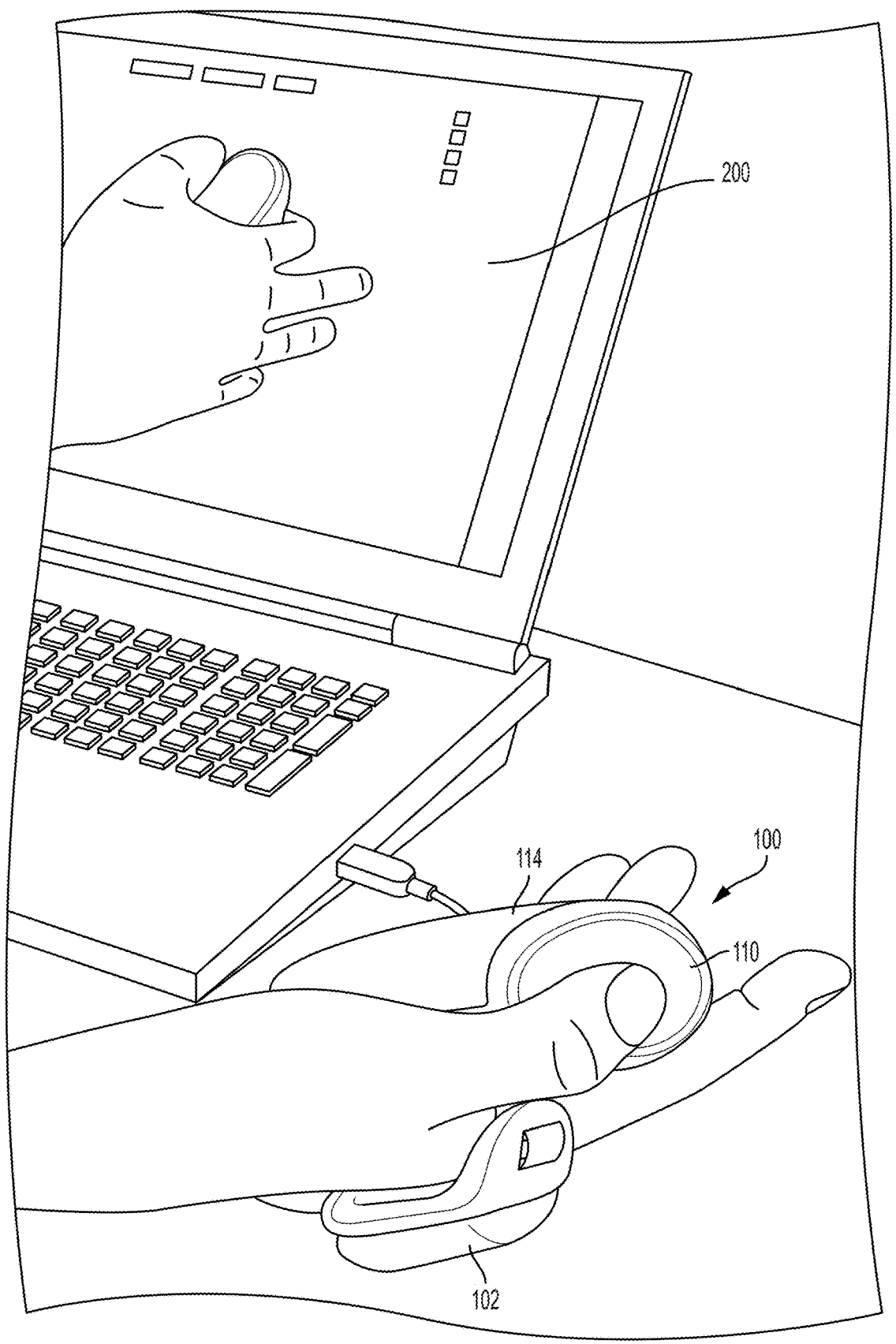
FIG. 4 shows an illustrative embodiment of a controller in the hand of a user, and a computerized model showing index finger position, based upon detected interaction of the index finger with the trigger-centric portion of the controller.

Turning now to FIG. 4, a controller 100 in the hand of a user is shown, as is a computerized model 200 showing hand position—and particularly index finger position—based upon detected interaction of the index finger 107 with the trigger-centric portion 112 of the controller 100. As illustrated in FIG. 4, the index finger 107 of the hand 105 of a user is either in contact with, or nearly in contact with the trigger-centric sensor pattern, and thus, the computer model 200 of the hand 105 shows the similar engaged position on the computer display.

In an embodiment, a separate sensor pattern is used for the trigger-centric sensor. Generally, a trigger-type input is much more straightforward than inputs associated with other touches. In an embodiment, an index finger 107 has relatively limited degrees of freedom with respect to the controller 110. Accordingly, in an embodiment, the trigger sensor needs only one taxel to explain the relationship of the index finger 110 to a trigger-centric portion 112 of the controller 110. Because it is desirable to provide a relatively long hover-distance to the trigger-centric sensor pattern, e.g., up to 3.5 cm, or up to 5 cm, or up to 7 cm, or up to 10 cm), in an embodiment, the trigger-centric sensor pattern may be a made up of antenna that extend generally normal (inwardly or outwardly) to the surface of the trigger-centric portion 112 of the controller 100.

Capacitive sensor patterns have heretofore been proposed employing a sensor pattern using antenna that extend generally normal to the touch surface, see e.g., Applicant's prior U.S. patent application Ser. No. 15/224,226, filed on Jul. 29, 2016 entitled "Hover-Sensitive Touchpad," the entire disclosure of that application, and the applications incorporated therein by reference, are incorporated herein by reference. In an embodiment, the trigger-centric sensor pattern is made up of one transmit antennae, and one receive antenna. In an embodiment, the trigger-centric sensor pattern is made up of one transmit antennae, and two or more receive antenna.

In practice, the degrees of freedom of the index finger 107 may require more than single-taxel resolution. Accordingly, in an embodiment, the trigger-centric sensor pattern is a made up of a more complex sensor pattern than described above. In an embodiment, a grid of rows and columns is employed. In an embodiment, a trigger-centric sensor pattern is created using sides of a diamond-positioned square for receivers, and a central transmitter (not shown). In an embodiment, a trigger-centric sensor pattern is created using quadrants of a circle for receivers, and a central transmitter (not shown). In an embodiment, in either of the foregoing cases, smearing could be mitigated by the addition of decoupling lines or broader decoupling planes as discussed and shown above.

In an embodiment, the trigger-centric sensor pattern differs from the thumb-centric sensor pattern. In an embodiment, the trigger-centric sensor pattern differs from the sensor pattern used on at least a portion of the body of the controller 110.

Figure 5A:
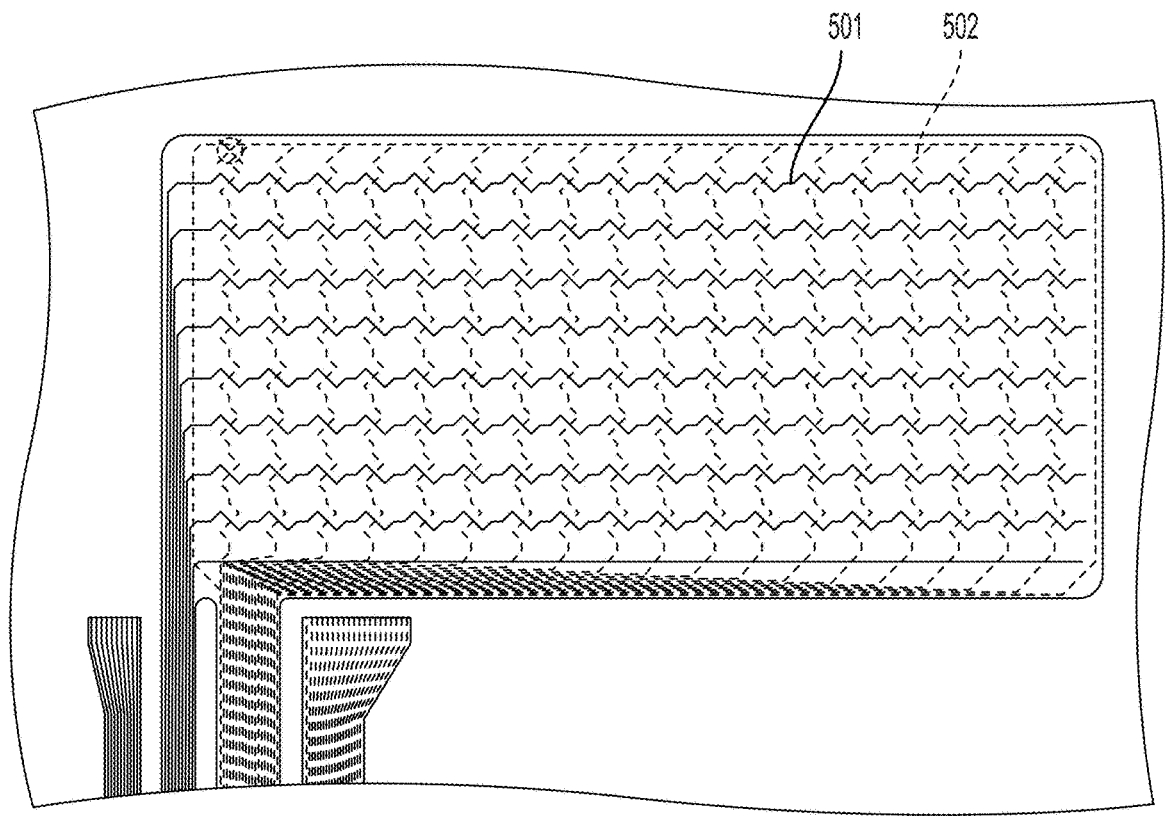
FIG. 5A shows an illustrative embodiment of a three-layer sensor pattern for use in connection with the trigger-centric portion of a controller.
Figure 5B:
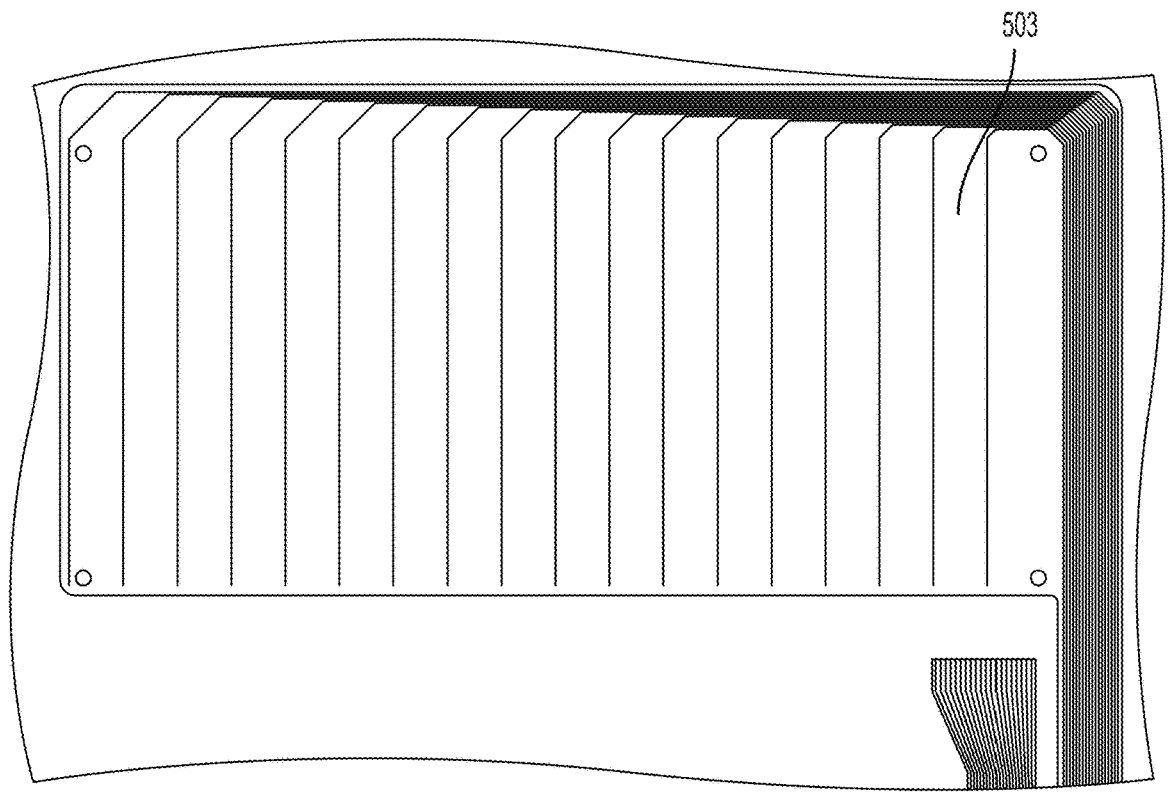
FIG. 5B shows an illustrative embodiment of a three-layer sensor pattern for use in connection with the trigger-centric portion of a controller.
Figure 6A:
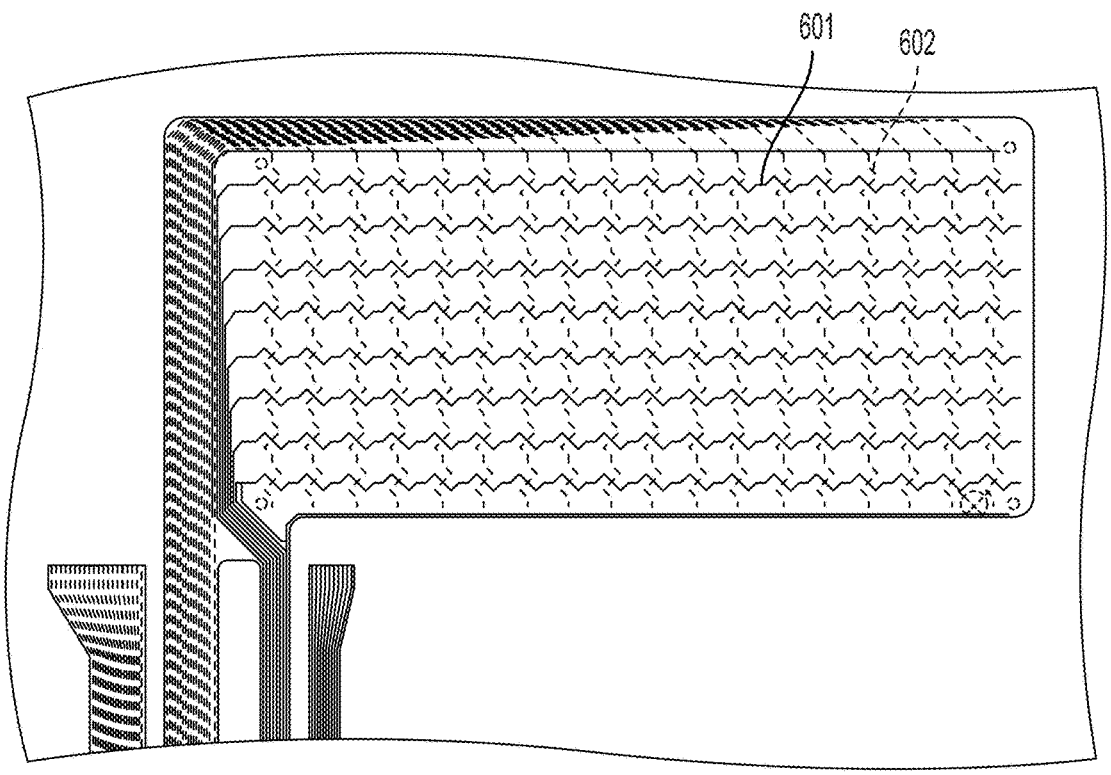
FIG. 6A shows another illustrative embodiment of a three-layer sensor pattern for use in connection with the trigger-centric portion of a controller.
Figure 6B:
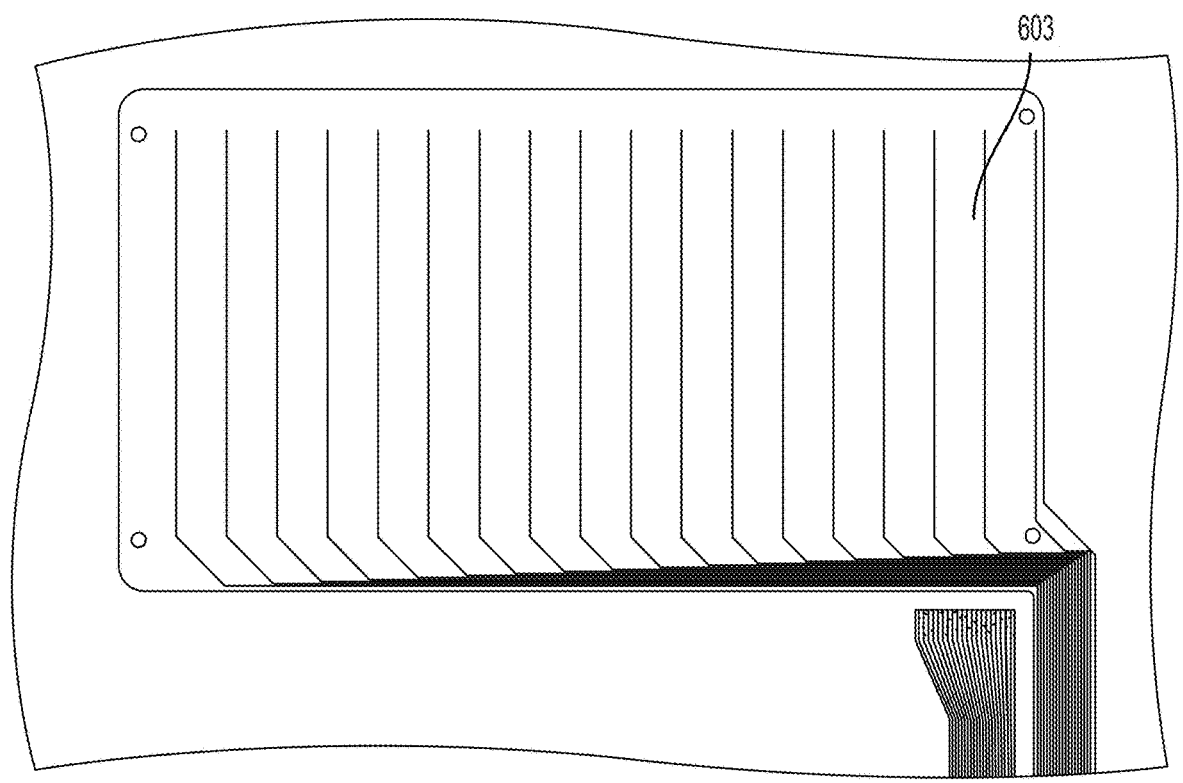
FIG. 6B shows another illustrative embodiment of a three-layer sensor pattern for use in connection with the trigger-centric portion of a controller.

Turning now to FIGS. 5A-8B, illustrative three layer trigger-centric sensor patterns are shown. In an embodiment, as shown in FIG. 5A, two receive layers are made up of irregular (i.e., not straight) conductor lines 501, 502, in a generally grid-like layout. In FIG. 5B, a transmit layer is made up of generally parallel conductors 503 running vertically with respect to the trigger-centric sensor pattern. In an embodiment, as shown in FIG. 6A, two receive layers are made up of irregular (i.e., not straight) conductor lines 601, 602, in a generally grid-like layout. In FIG. 6B, a transmit layer is made up of generally parallel conductors 603 running vertically with respect to the trigger-centric sensor pattern. As discussed above, in each case, in an embodiment, smearing may be mitigated by the addition of decoupling lines or broader decoupling planes.

Figure 7A:
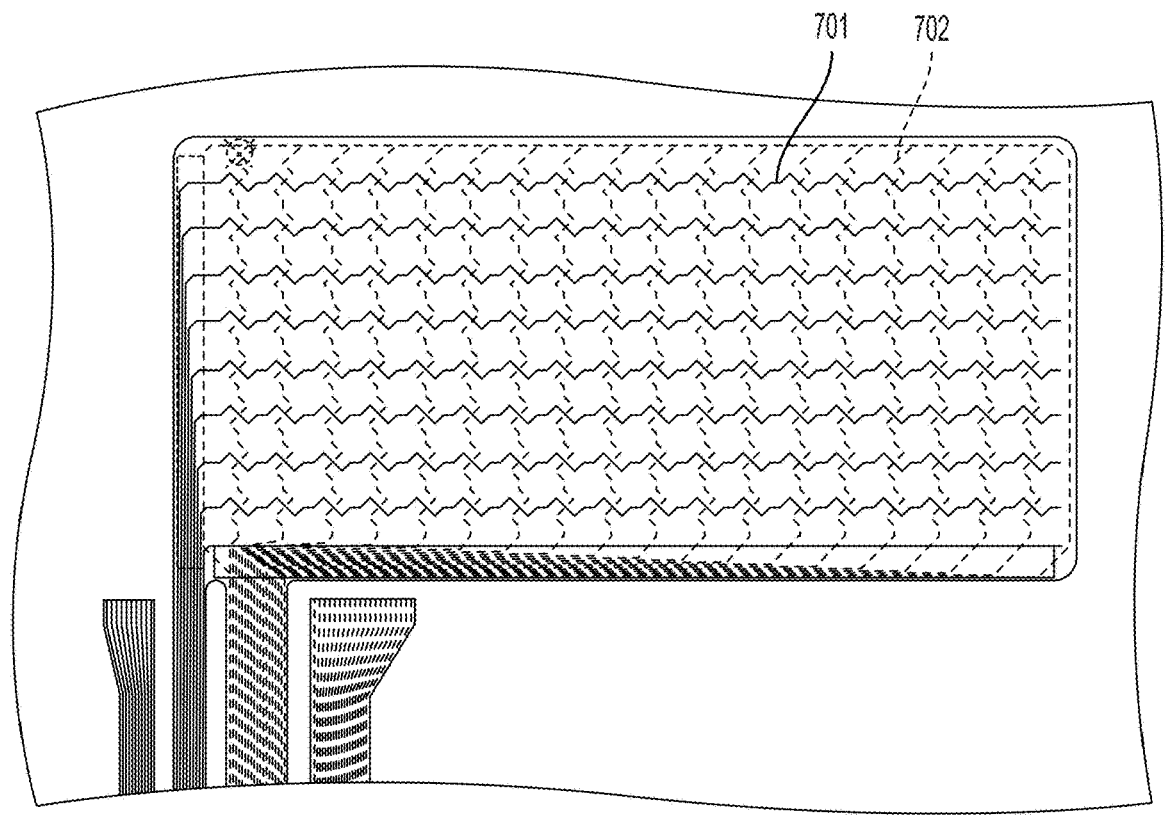
FIG. 7A shows yet another illustrative embodiment of a three-layer sensor pattern for use in connection with the trigger-centric portion of a controller.
Figure 7B:
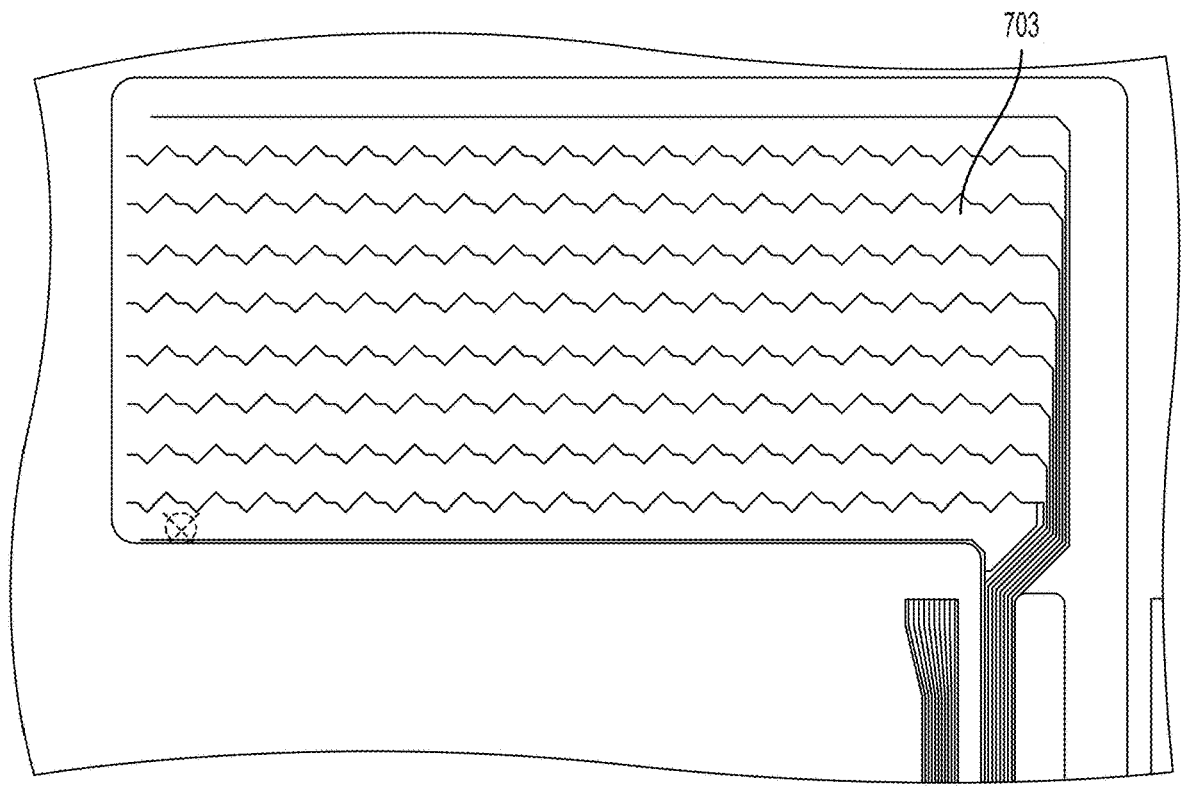
FIG. 7B shows yet another illustrative embodiment of a three-layer sensor pattern for use in connection with the trigger-centric portion of a controller.

In an embodiment, in FIG. 7A, two receive layers are made up of irregular (i.e., not straight) conductor lines 701, 702 in a generally grid-like layout. In FIG. 7B, the transmit layer is also made up of irregular conductors 703, which are generally parallel, and run horizontally, rather than vertically across the trigger-centric sensor pattern. In an embodiment, smearing may be mitigated by the addition of decoupling lines or broader decoupling planes.

Figure 8A:
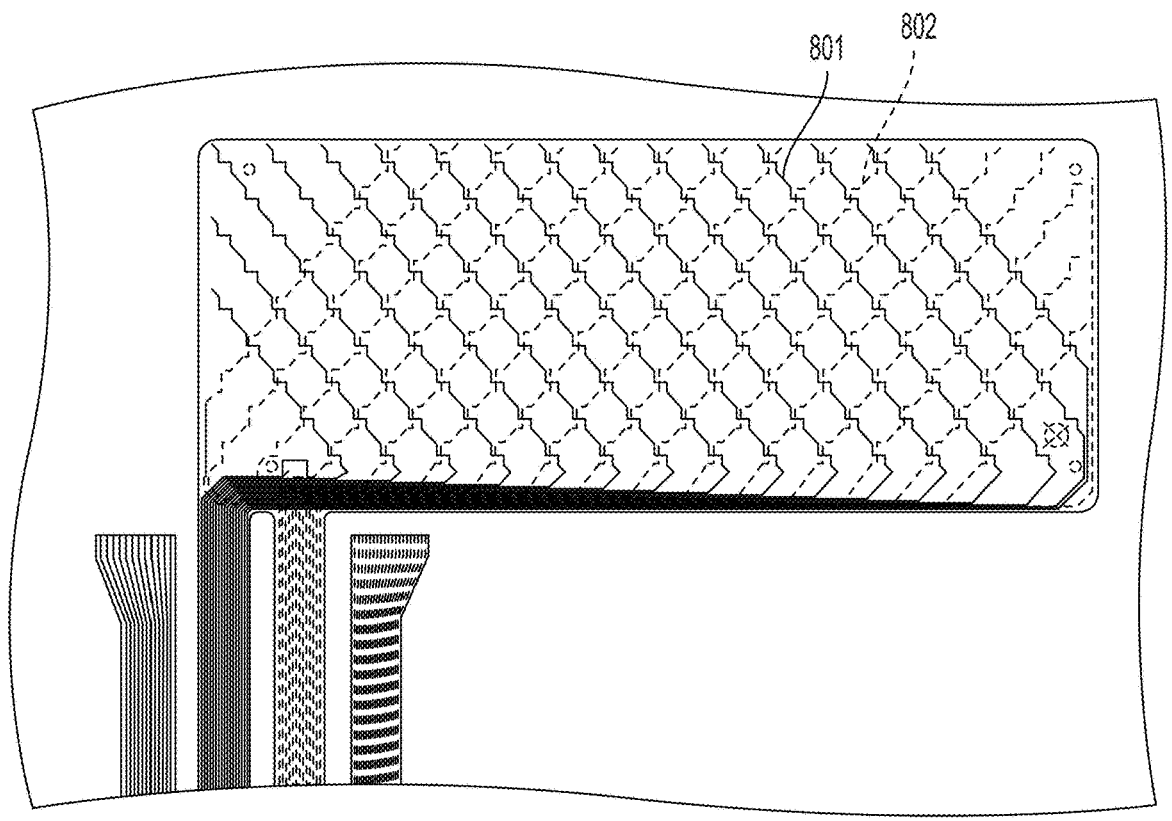
FIG. 8A shows a further illustrative embodiment of a three-layer sensor pattern for use in connection with the trigger-centric portion of a controller.
Figure 8B:
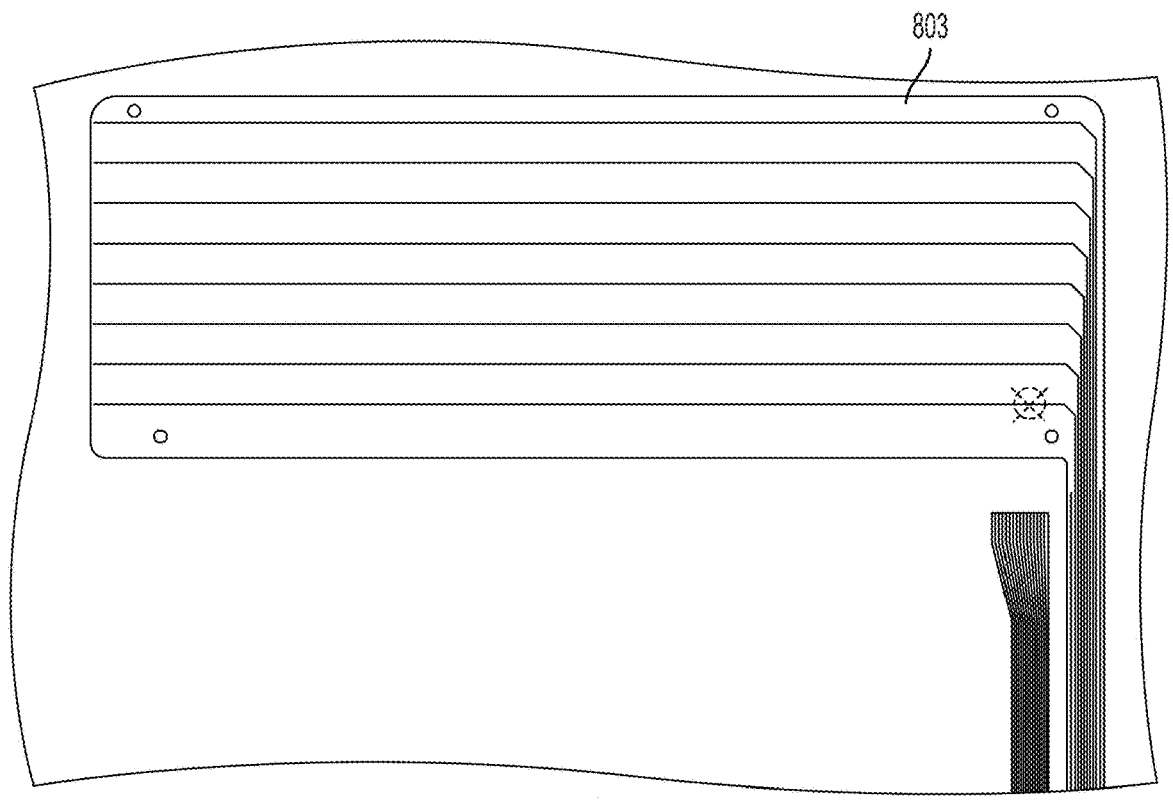
FIG. 8B shows a further illustrative embodiment of a three-layer sensor pattern for use in connection with the trigger-centric portion of a controller.

In an embodiment, in FIG. 8A, two receive layers are made up of irregular (i.e., not straight) conductor lines 801, 802 in a generally diamond-like layout. In FIG. 8B a transmit layer is made up of conductors 803, which are generally parallel and run horizontally across the trigger-centric sensor pattern. In an embodiment, smearing may be mitigated by the addition of decoupling lines or broader decoupling planes. In an embodiment, frequency-orthogonal frequencies are transmitted on each of the conductors 803 of the transmit layer. Each of the diagonal conductor lines 801, 802 on each layer is connected to a unique receiver. In an embodiment, two heatmaps are produced, one corresponding to the interaction between one set of diagonal receivers and the transmitters and another corresponding to the other set of diagonal receivers and the transmitters. In an embodiment, the two heatmaps may be convolved together. In an embodiment, convolving the two heatmaps provides increased resolution. In an embodiment, convolving the two heatmaps provides improved signal-to-noise characteristics. In an embodiment, convolving the two heatmaps provides increased fidelity with respect to the sensed action.

In an embodiment, the row-column orientation of the trigger-centric sensor pattern is placed at an angle such that the rows and columns run diagonally across the face of the trigger-centric sensor pattern as it is oriented on the controller 100. In an embodiment, the rows, and the columns of the trigger-centric sensor pattern are placed at an angle with respect to their respective orientation on the controller 100 of approximately 30 degrees. In an embodiment, the rows, and the columns of the trigger-centric sensor pattern are placed at an angle with respect to their respective orientation on the controller 100 of approximately 60 degrees. In an embodiment, the trigger-centric sensor pattern is made of three layers, comprising two layers of receivers that run generally diagonally with respect to the trigger-centric portion of the controller 100, and a third layer of transmitters that operate above, below or between the two layers of receivers, and are oriented either generally horizontally or generally vertically with respect to the trigger-centric portion of the controller 100.

In an embodiment, one or more frequencies that are each frequency orthogonal to the frequencies that are transmitted on the transmitters are applied to the user's body. In an embodiment, a frequency that is frequency orthogonal with the frequencies that are transmitted on the transmitters is applied to the user's body. In an embodiment, the frequency applied to the user's body may be applied to the palm or the back of the user's hand from one or more contacts on the controller (not shown). In an embodiment, a third heatmap can be produced resolving the applied frequency. In experimental testing, data sensed for the applied frequency data reveals peaks that are shaped materially different from, and easily distinguishable from, those resulting from touch without applied frequency as discussed above. In an embodiment, sensor data for the applied frequency is be used for proximity measurement at relatively long ranges (e.g., more than 2 cm) from the sensor. In an embodiment, sensor data for the applied frequency is be used for positional measurement at relatively short ranges from the sensor (e.g., less than 1 cm). In an embodiment, applied frequency data may result from two or more frequencies that are frequency orthogonal to the frequencies that are transmitted on the transmitters and each other. In an embodiment, the two or more applied frequencies may be applied to the user's palm or the back of the user's hand from one or more contacts on the controller (not shown). In an embodiment, each of the two or more applied frequencies are applied to the user's palm or the back of the user's hand from the same contact or contacts on the controller (not shown). In an embodiment, each of the two or more applied frequencies are applied to the user's palm or the back of the user's hand from a different contact or contacts on the controller (not shown). In an embodiment, each of the two or more applied frequencies are applied to the user's palm or the back of the user's hand from a different contact or contacts on the controller (not shown), and contacts are spaced in physical location to result in differentiation between the signals.

Figure 9:
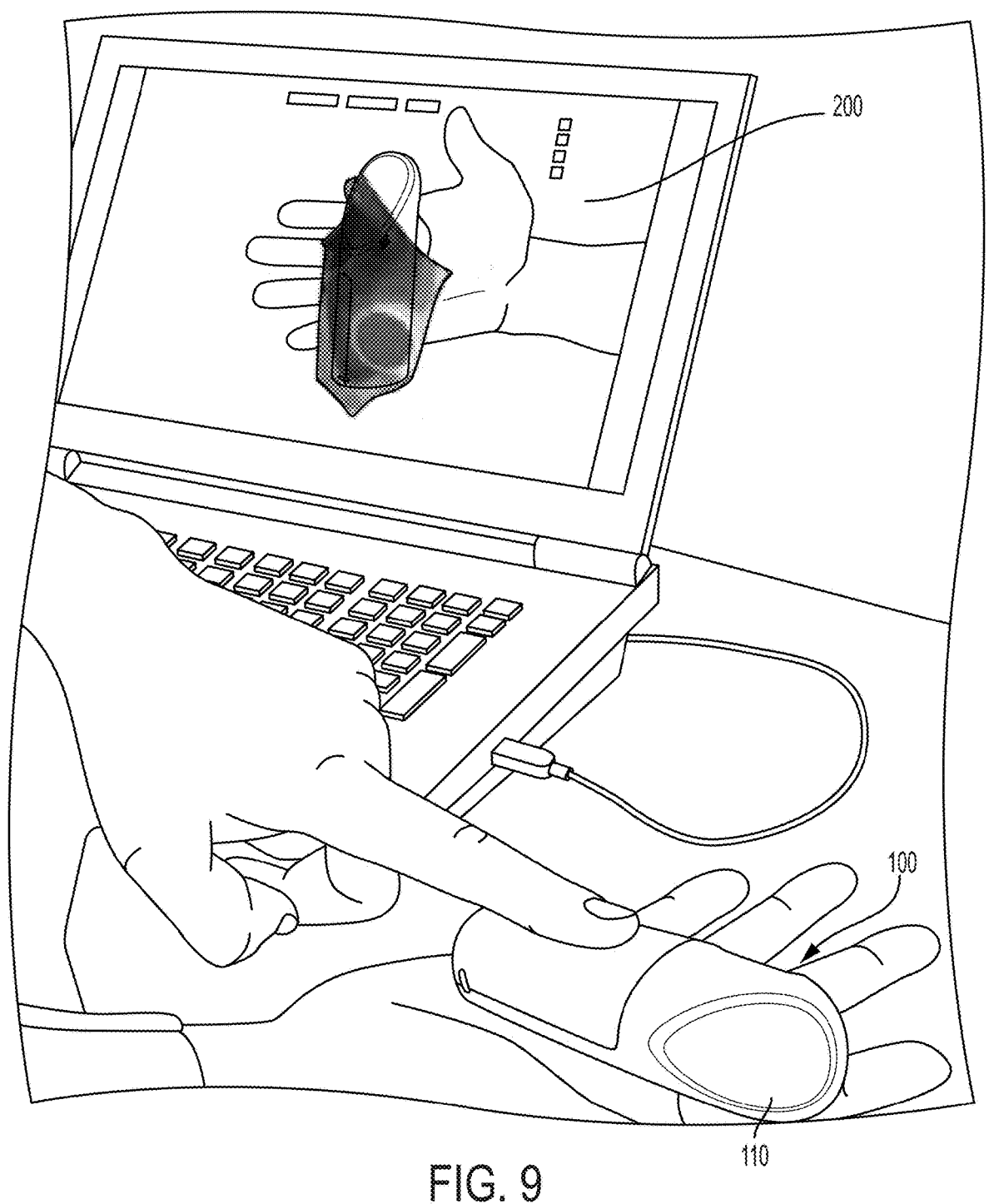
FIG. 9 shows an illustrative embodiment of a controller in the hand of a user, and a computerized model showing hand position based on the capacitive sensors in the controller body.

Turning now to FIG. 9, a controller 100 in the hand 105 of a user is shown, as is a computerized model showing hand position based on the capacitive sensors in the controller body 114. FIG. 9 further shows a graphically displayed heatmap showing the position and pressure of an index finger from the other hand of the user. As illustrated in FIG. 9, the other-hand index finger 107 of the user is in substantial contact with the body sensor pattern.

In an embodiment, a separate pattern is used for the body sensor pattern. Unlike the trigger-centric and thumb-centric sensor patterns, in an embodiment, the body sensor pattern may be used in irregular and/or complex curvatures in three dimensions. In an embodiment, this requires both proper sensor design and specialized software and mathematical considerations as discussed herein.

Figure 10A:
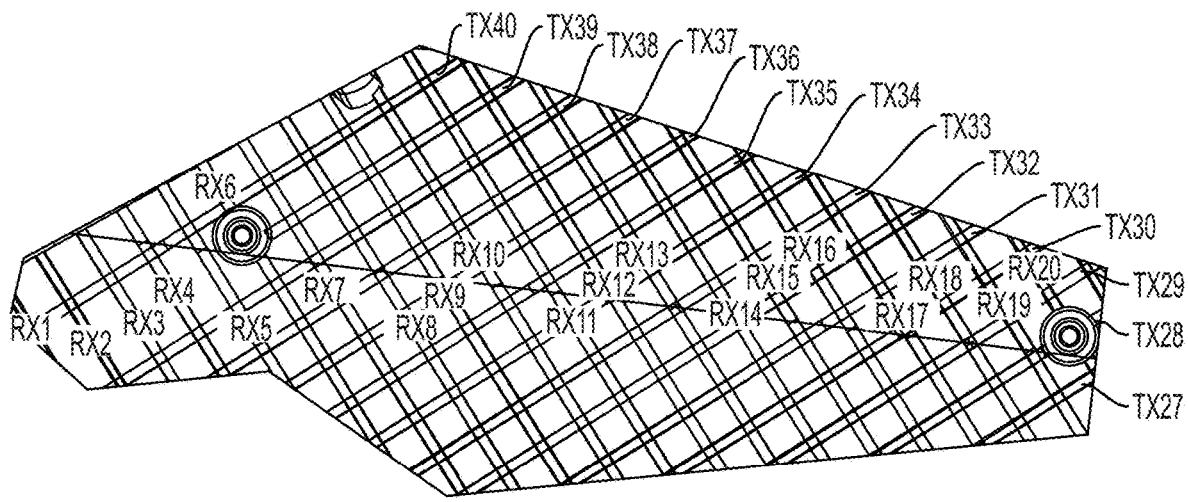
FIG. 10A shows an illustration of one view of an embodiment of a fishbone sensor pattern made of rows and columns following the irregular curvature of the controller body.
Figure 10B:
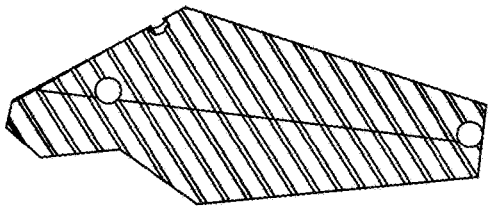
FIG. 10B shows a component that can be used to form a left face of an embodiment of a controller.
Figure 10C:
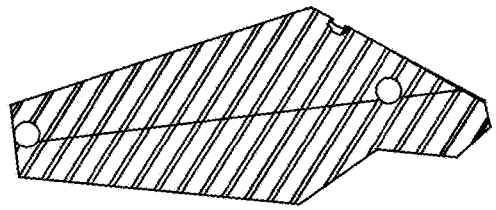
FIG. 10C shows a component that can be used to form a left face of an embodiment of a controller.
Figure 10D:
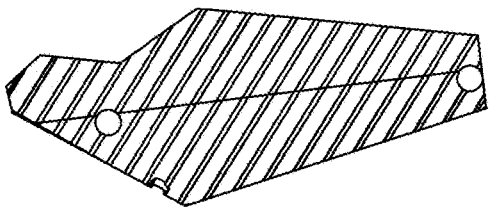
FIG. 10D shows a component that can be used to form a right face of an embodiment of a controller body.
Figure 10E:
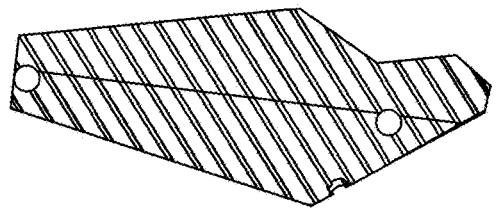
FIG. 10E shows a component that can be used to form a right face of an embodiment of a controller body.
Figure 10F:
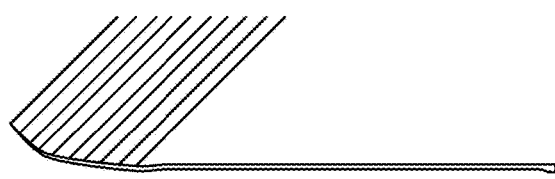
FIG. 10F shows a two-dimensional trace of sensor patterns and the feedlines that may be used in connection with an embodiment of a controller.
Figure 10G:
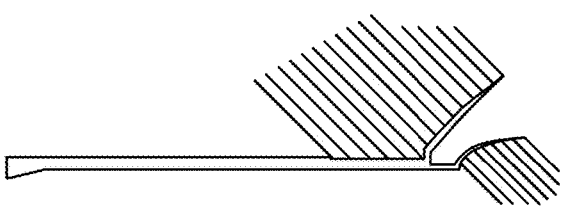
FIG. 10G shows a two-dimensional trace of sensor patterns and the feedlines that may be used in connection with an embodiment of a controller.

FIG. 10A shows an illustration of one view of a fishbone sensor pattern is shown which is made of rows and columns following the irregular curvature of the controller 100. FIGS. 10B and 10C show an embodiment of two components that can be used to form the left face of a body portion 114. FIGS. 10D and 10E show an embodiment of two components that can be used to form the right face of a body portion 114. FIGS. 10F and 10G show a two-dimensional trace of sensor patterns and the feedlines that may be used in connection with the components for the right face of the body portion 114 shown in FIGS. 10D and 10E. FIG. 10G further shows a two-dimensional trace of sensor patterns and the feedlines that could be used in connection with the receive side of a thumb-centric sensor pattern on the controller 100 (see e.g., FIG. 1).

FIGS. 10B-E show mechanical troughs (e.g., spaces) provided for the antenna on the interior (e.g., concave) side of the part. The parts shown in FIGS. 10C and 10E fit within the interior surface of the parts shown in FIGS. 10B and 10D. In an embodiment, once fitted with antenna, the FIG. 10B/C combination and the FIG. 10D/E combination form halves of the body portion 114, and a sensor pattern for sensing in connection with the controller 100 described herein. The two halves of the body portion 114 may be fit together to form the body portion 114. In an embodiment, as discussed above, separate thumb-centric and trigger-centric sensor patterns may be employed, and may be supported by the body portion 114.

In an embodiment, arbitrary geometries are accommodated by positioning the sensor to have as close as possible to the same number of row-column crossings as the others. Thus, in an embodiment, the levels and number of crossing should, to the extent possible, be equal.

In an embodiment, the left half of the body portion 114 and the right half of the body portion 114 share transmit antenna. In an embodiment, the left half of the body portion 114 and the right half of the body portion 114 share receive antenna. Thus, in an embodiment, frequencies transmitted on the left side antenna are also transmitted on the right side antenna, and vice-versa. Similarly, in an embodiment, a receive antenna on each half of the body portion 114 may be associated with one receiver. Thus, in an embodiment, each transmitter antenna in the left half of the body portion 114 of the controller 100 share a common frequency with a transmitter antenna in the right half of the body portion 114 of the controller 100, and each receive antenna in the left half of the body portion 114 of the controller 100 is conductively coupled to a receive antenna in the right half of the body portion 114 of the controller 100. In this manner, a smaller number of transmitters and receivers can be used to operate the controller 100.

In an embodiment, the left half of the body portion 114 and the right half of the body portion 114 do not share transmit antenna. In an embodiment, the left half of the body portion 114 and the right half of the body portion 114 do not share receive antenna. Thus, in an embodiment, frequencies transmitted on the left side antenna are not transmitted on the right side antenna, and vice-versa. Similarly, in an embodiment, each receive antenna on each half of the body portion 114 is associated with its own receiver. Thus, in an embodiment, each receive antenna on each half of the body portion 114 is associated with its own receiver, and each transmit antenna on each half of the body portion 114 is associated with its own transmitter and its own unique orthogonal frequency. Nonetheless, in an embodiment, each sensor of half of the body portion 114 may detect thru-body crosstalk. In an embodiment, due to such thru-body crosstalk a receiver on one half of the body portion 114 may receive signals transmitted on a transmitter on the other half of the body portion 114. In an embodiment, the receivers on each half of the body portion 114 are adapted to detect signals transmitted on the other half of the body portion 114, in addition to being adapted to detect signals transmitted on its own half of the body portion 114.

Taxels

As used herein, a taxel is a localized area of crosstalk between one FMT logical transmitter and one FMT logical receiver. In an embodiment, multiple conductive elements may be connected to one logical receiver or transmitter. Even when multiple conductive elements are employed, the interaction still provides only one logical transmitter or receiver. Moreover, where multiple logical elements are connected to a common conductive element, because of the physics of voltage summing, the structure would be logically reduced as if each permutation of the TX/RX pair were individual and separate.

Generally, taxels behave analogously to an antenna with an antenna pattern. In an embodiment, touch objects cause a disturbance in the baseline (non-touch) response equivalent to the position vector (X, Y, Z) of the touch object relative to the taxel and its three dimensional touch response. In an embodiment, taxels which respond from more than one center (e.g., two or more centers of antenna pattern) are not typically chosen because of the inherent confusion which can result, as two touch objects, at two different position vectors can result in the same signal disturbance.

The notion of crosstalk as used in the definition of taxel bears clarification. Unintentional crosstalk between a given RX/TX pair may cause undesirable effects. For example, unintentional crosstalk may result in a non-singular localized area, and it is seldom desirable to introduce confusion into the disturbance position vector calculation. Similarly, uneven or dissimilar time domain response across the plurality of RX channels being used in a given application may introduce undesirable trade offs in the time domain, with respect to selected RX impedance, RX gain, time domain filtering and equalization scheme employed. Thus, crosstalk as used herein refers to a desirable and measurable effect, rather than the typical undesirable effect that is generally referred to in electronics literature. Thus, when referring to body-transmitted crosstalk, this application is referring, e.g., to a signal from a transmitter that is carried by the body (e.g., the hand) from a first location to another location where it can be sensed. Thus, for example, an index finger 107 may be in contact with a trigger-centric sensor pattern that transmits a unique orthogonal frequency, and that unique orthogonal frequency may be conducted to a receive antenna, and thus to a receiver on a thumb-centric sensor pattern—this signal conducted by the hand 105 would be referred to as crosstalk.

As another example, where signal A is on conductor X, and signal B is on conductor Y, and conductor X and conductor Y are in close proximity to one another, some portion of signal A may show up on conductor Y. In more traditional parlance, the crosstalk "aggressor" is signal A, and the crosstalk "victim" is signal B. Unlike the traditional view of crosstalk as undesirable, it will be apparent to one of skill in the art in view of this disclosure, that valuable information can be derived from crosstalk in the novel FMT object sensing methods and devices disclosed and described here.

In an embodiment, taxel components comprise two principal portions: portion A that is not reactive to touch objects (or injected frequencies); and portion B that are reactive to touch objects. The total crosstalk at a given frequency for a given taxel is A+B. In an embodiment, both the ratio of A:B and the overall magnitude of A+B are important to understanding data derived from the sensor patterns using FMT.

In an embodiment, each tixel crosstalk (A+B) sums with every other tixel crosstalk in the time domain, resulting in a complex time domain waveform which is eventually sampled in the Z domain, and separable into its constituent frequencies and magnitudes in the frequency domain. In an embodiment, the Vpp (voltage peak to peak) of this complex time domain waveform does not exceed the limits of the ADC (analog to digital converter) input. As such, in an embodiment, system design (including sensor design) includes optimizing Vpp at the ADC input. In an embodiment, taxel A+B, number of taxels on a given receiver, and unintentional cross talk dominate the Vpp of this time domain waveform.

Despite that A is non-reactive to a touch object, and thus, it does not contribute directly to a high signal-to-noise design, the design of good sensors requires that both A and B are considered. For example, high A ratio sensors may be less susceptible to external noise injection, system noise, and unintentional cross talk. And for example, high B ratio sensors may have a greater measurable response to touch objects both in close contact, and further away, and more signal injection and cross coupling capability. Thus, in an embodiment, as will apparent to a person of skill in the art in view of this disclosure, for a given application and desired sensor response, both A and B should be selectively designed to achieve the desired result.

In design of one embodiment of the human-machine interface controller 100 shown, e.g., in FIGS. 1A-1F, 3A-3D and 10A-10G, one design goal was to provide the controller body portion 114 with high hover sensitivity. In an embodiment, individual width conductive filaments are placed in mechanical troughs which are cut into the complex curved surfaces, providing exact placement of each taxel in X,Y,Z space relative to the origin of the controller body portion 114. Thus, the taxels in the controller body portion 114 result from unique TX/RX crossings at defined fixed points in the mechanical design.

For two dimensional sensors (e.g., touch panels), by simulation, empirical measurement, or otherwise an interpolation curve can be calculated for the sensor. The interpolation curve is the mathematical relationship between the FMT signal disturbance at a tixel, and the distance of a touch object from that taxel. This interpolation equation allows calculation of the XY position of a touch object. In an embodiment, the interpolation equation is used across data from multiple taxels and the location of the touch can be identified even when the touch object is not directly on a single taxel.

In an embodiment, where the sensor pattern is non-planar, taxel location must be represented in XYZ, and the vector normal to the taxel may be provided and used, as well as an interpolation curve in XYZ, to calculate position in XYZ with respect to a given grouping of taxels. Thus, in an embodiment, each row-column crossing represents a three-dimensional taxel for reconstruction, with a three-dimensional mapping into space at a direction normal to the surface of the controller 100. In other words, the taxel field direction is projected normal to the surface of the controller 100, and it is remapped into three-dimensional space. Thus, in an embodiment, a three-dimensional space heatmap is constructed and the taxel data along with information about the orientation of the taxel are used to populate the heatmap.

Thus, in an embodiment using the fishbone sensor depicted e.g., in FIG. 10A, for the body portion 114 of the controller 100, the A+B was moved primarily in favor of high B ratio. In an embodiment, moving the A+B in in favor of high B ratio, may extend signal detection capability distant from the surface of the body portion 114. In an embodiment, moving the A+B in in favor of high B ratio may be accomplished by increasing the separation layer between TX and RX layers. In an embodiment, the separation layer between TX and RX layers is at least 500 microns. In an embodiment, the separation layer between TX and RX layers is 1000 micron. In an embodiment, as the distance between the TX conductor and RX conductor increases, A drops more quickly than B. Thus, in an embodiment, increasing the separation layer between TX and RX layers results in a reduction of A+B, but an increase in the ratio of B with respect to A. In an embodiment, the reduction of A+B allowed an increase in TX Vpp without exceeding the limits of the ADC. Thus, in an embodiment, a TX voltage of at least 18 Vpp was employed. In an embodiment, a TX voltage of 24 Vpp was employed.

Frequency Injection Supporting Hand Tracking

In an embodiment, FMT capacitive sensor hand tracking can be improved when supported by frequency injection. For a description of the FMT capacitive sensor, see, generally, Applicant's prior U.S. patent application Ser. No. 13/841,436, filed on Mar. 15, 2013 entitled "Low-Latency Touch Sensitive Device" and U.S. patent application Ser. No. 14/069,609 filed on Nov. 1, 2013 entitled "Fast Multi-Touch Post Processing." Frequency injection refers to the application of a frequency, or multiple frequencies, to a user's body, and thus, using the user's body as a conductor of that frequency onto an FMT capacitive sensor. In an embodiment, an injected frequency is frequency orthogonal to the frequencies that are transmitted on the FMT capacitive sensor transmitters. In an embodiment, a plurality of injected frequencies are both frequency orthogonal with respect to each other, and frequency orthogonal to the frequencies that are transmitted on the FMT capacitive sensor transmitters.

Generally, FMT employs a sensor pattern where rows act as frequency transmitters and columns act as frequency receivers. (As discussed above, the designation of row and column are arbitrary, and not intended to designate, e.g., a grid-like organization, nor a generally straight shape of either). In an embodiment, when combining frequency injection with FMT, the columns are additionally used as receivers to listen for the injected frequency or frequencies. In an embodiment, when combining frequency injection with FMT, both the rows and the columns are additionally used as receivers to listen for the injected frequency or frequencies.

In an embodiment, a known frequency is, or known frequencies are, carried to, e.g., the hand of the user, using one or more separate transmitters. In an embodiment, each separate transmitter is associated with a wristband, a hand strap, a seating pad, an armrest, or any other object that is likely to be in touch with the user. In an embodiment, a controller 100 deploys one or more separate transmitters on one or more portions of the body portion 114 of the controller 100, when the controller 100 is in use, is generally in contact with the controller user's hand. In an embodiment, a controller 100 having a hand strap deploys one or more separate transmitters on a hand strap 102 that, when the controller 100 is in use, it is generally in contact with the controller user's hand.

In an embodiment, with the known frequencies injected, FMT can measure the strength of the known frequency or the known frequencies at each receiver. In an embodiment, with the known frequencies injected, FMT can measure the strength of the known frequency or the known frequencies on each row and on each column by associating a receiver and signal processor with each row and each column. In an embodiment, the measurement of signal strength for the injected frequency or frequencies on each row provides information concerning the location of the body part conducting the injected frequency.

In an embodiment, the measurement of signal strength for the injected frequency or frequencies on each row and on each column provides more detailed information concerning the location of the body part conducting the injected frequencies. In an embodiment, the location information from the rows and from the columns provides two separate one-dimensional sets of measurement of the signal strength. In an embodiment, the two one-dimensional sets provide a descriptor which can be used to generate intermediate representations such as a 2D Heatmap (similar to conventional FMT Transmitter/Receiver Heatmap). In an embodiment, the two one-dimensional sets provide a descriptor which can be used to enable better fidelity in reconstruction of the motion of fingers in proximity of the sensor. In an embodiment, detected frequency injection signals provides increased hover range over the range of the FMT sensor pattern alone.

In an embodiment, frequency injection descriptors are used to create predefined profiles of signal strengths corresponding to a set of discrete positions of a finger. In an embodiment, the descriptors are combined with baseline and noise reduction techniques or other multi-dimensional analysis techniques (see, e.g., Applicant's prior U.S. patent application Ser. No. 14/069,609, filed on Nov. 1, 2013 entitled "Fast Multi-Touch Post-Processing" and U.S. patent application Ser. No. 14/216,791, filed on Mar. 17, 2014 entitled "Fast Multi-Touch Noise Reduction") to extract meaningful information from these descriptors that can correlate to the finger motion. In an embodiment, FMT heatmap processing techniques can also be used on top of this frequency strength signals. By combining FMT heatmap processing and descriptors resulting from detected frequency injection signals, fidelity may be improved.

In an embodiment, hand tracking is computed using a hierarchical skeleton based description of a virtual hand to describe the real hand. In an embodiment, the frequency injection descriptors are mapped into a continuous realtime animation or other digital representation of that hierarchical skeleton based description of a virtual hand, thus mimicking the real hand motion.

It will be apparent to a person of skill in the art that the mapping can be achieved using linear or nonlinear functions, in real time, to translate the signal feed into a feed of finger angles or a feed of skeletal angles. In an embodiment, correlation properties between signal strength samples and a ground truth reference can be employed. In an embodiment, a ground truth reference is captured using another technique, such as, without limitation, motion capture, other vision based processing technique or predefined captured poses.

It will be apparent to a person of skill in the art that the intrinsic properties of the signal injection as applied to and measured from the hand 105 as described above can be used as the basis to define the model mapping. In an embodiment, one or more of the following generalized data techniques can be employed for such mapping: manual or automatic supervised or non-supervised training, data mining, classification or regression techniques. In an embodiment, the data technique is used to identify the adequate definition of the mapping functions which can be used for hand modeling, and thus hand tracking purposes. As discussed above, in an embodiment, the signal injection hardware and software as discussed above, can be combined with FMT capabilities, exploiting the same FMT sensor pattern, transmitters and receivers. In an embodiment, the signal injection hardware and software as discussed above, can be combined with FMT capabilities, thus complementing an FMT touch sensor system with additional receivers. In an embodiment, the signal injection hardware and software as discussed above, can be combined with FMT capabilities, thus complementing an FMT touch sensor system with capacity to recognize additional injected frequencies.

Merging Touch and Hover, and Frequency Injection Information to Track Hand Position In an embodiment, one or more overlaid sensors are used to track different information. In an embodiment, touch information may be tracked using FMT. See, e.g., Applicant's prior U.S. patent application Ser. No. 14/069,609, filed on Nov. 1, 2013 entitled "Fast Multi-Touch Post-Processing." Using FMT provides touch information for both contact and hover up to about 4 cm. In an embodiment, frequency injection is added to FMT. In an embodiment, one or more frequencies are injected into the body at or proximal to the hand. In an embodiment, adding frequency injection to FMT provides better fidelity and more range in hover. In an embodiment, the same sensor was used to read the FMT frequencies (a/k/a "internal frequencies") and one additional injected frequencies (a/k/a "external frequency"). In an embodiment, the same sensor was used to read the FMT frequencies (a/k/a "internal frequencies") and a plurality of additional injected frequencies (a/k/a "external frequencies"). In an embodiment the combination of FMT and frequency injection effectively extended the range of hand modeling beyond 4 cm. In an embodiment the combination of FMT and frequency injection effectively extended the range of hand modeling to beyond 5 cm. In an embodiment the combination of FMT and frequency injection effectively extended the range of hand modeling beyond 6 cm. In an embodiment the combination of FMT and frequency injection effectively extended the range of hand modeling to full flexion, i.e., the full range of motion of the hand.

In an embodiment, a single sensor/sensor pattern is capable of receiving all of the frequency information. In an embodiment, multiple sensor patterns (transmitter and receiver layers) are overlaid (see, e.g., FIGS. 3A-3D, 5A, 5B, 8A, 8B and 10A-10G).

In an embodiment, elements (e.g., antenna) are placed on or near the surface of the body portion 114 of the controller 100, where they are likely to be in touch with the user's hand 105 during operation of the controller 100. When sufficiently in touch with the hand 105 in operation of the controller 100, a signal enters and goes through the hand 105 which can be detected by the sensor. The transmission loop goes from a signal generator, to the element on the body portion 114 of the controller 100, to the hand 105, to the receive antenna (e.g., column) where it is measured by FMT. In an embodiment, the transmission loop is closed when the hand 105 is in touch (but not necessarily in contact with) the antenna and in touch (but not necessarily in contact with) the receive antenna. In an embodiment, elements (e.g., antenna) are placed on a controller strap 102 where they are likely to be in touch with the back of the user's hand 105 during operation of the controller. A transmission loop is created as described above with the elements of the body portion 114, except that the elements of the controller strap 102 would touch the back of the user's hand 105 rather than, e.g., the palm. In an embodiment, a signal injection system is in the form of, or at least partly in the form of: a wristband; a watch; a smartwatch; a mobile phone; a glove; a ring; a stylus; a pocketable object; a seat cushion or other seating pad; a floor mat; an armrest; a desk surface; a belt; a shoe; a wearable computing device, or any other object that is likely to be in touch with the user during operation of the controller 100. In an embodiment, a transmission loop is similarly created by the user's body between the injected signal source and the receive antenna.

In an embodiment, the intensity of the signal from the signal generator to the element should be sufficient to allow detection of the hand beyond the 4 cm range. In an embodiment, the intensity of the signal from the signal generator to the element should allow detection beyond the 5 cm range. In an embodiment, the intensity of the signal allows detection beyond 7 cm. In an embodiment, the intensity of the signal allows detection of full flexion of the hand 105.

Sensing Index Finger Flexion

In an embodiment, index finger flexion is sensed using close hover and contact data via FMT. In an embodiment, close hover and contact data from a trigger-centric sensor pattern is used to sense index finger flexion.

In an embodiment, a reference frame is stored. In an embodiment, a reference frame reflects the state of the sensor when the controller is at rest, e.g., no detectable signals are received as a result of touch. In an embodiment, a single N×M frame of raw signal data is saved as the baseline.

In an embodiment, using the baseline, an incoming frame is converted into decibels (i.e. −20.0f*log 10(incoming/baseline). The converted incoming frame is referred to as the heatmap.

In an embodiment, the average signal value is calculated. The average signal value is referred to as the waveform. In an embodiment, for each column M in the heatmap, the average signal value of the column is calculated as the waveform. In an embodiment, the waveform is calculated for each row N. In an embodiment, the waveform is calculated from a combination of the signal values of rows and columns. In an embodiment, the selection of information for calculation of the waveform depends on the sensor pattern.

Figure 11A:
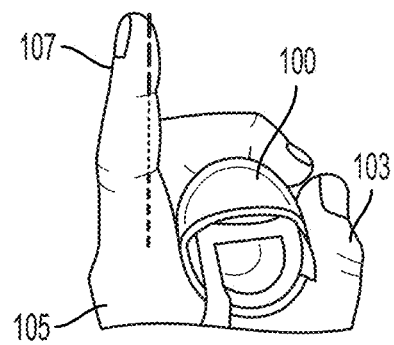
FIG. 11A shows an illustration of index finger position and motion, and templates and waveforms associated with the index finger position and motion.

Referring now to FIG. 11A, where the controller 100 is grasped and the index finger 107 is nearly vertical. In an embodiment, the waveform representing the nearly vertical index finger 107 is saved as a template. In an embodiment, the template is associated with the hand 105 or user from which the template was acquired. In an embodiment, multiple templates (e.g., for multiple hands and/or users, and/or for the same hand) are also saved for future use. In an embodiment, multiple templates may be combined. Templates may be combined to normalize information or obtain statistical data about the hand 105 and index finger 107.

Figure 11B:
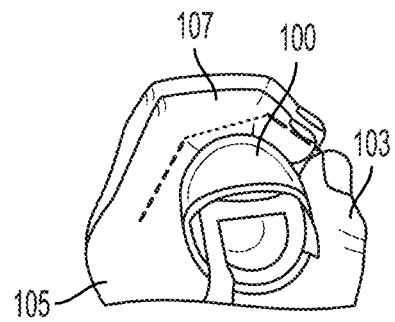
FIG. 11B shows an illustration of index finger position and motion, and templates and waveforms associated with the index finger position and motion.

Turning now to FIG. 11B, in an embodiment, during typical finger movement, the incoming waveform can be compared against the template. In an embodiment, the normalized root mean square deviation (NRMSD) is calculated to provide a similarity measure of the incoming waveform and the template. In an embodiment, the NRMSD is in the range of zero to one.

To improve the accuracy of the similarity measure, in an embodiment, the incoming waveform and template are split into three regions corresponding to the individual bones of the index finger 107 (proximal, middle, distal) and their position along the sensor. In an embodiment, three NRMSD values are calculated, one for each section of the finger ($NRMSD_{proximal}$, $NRMSD_{middle}$, $NRMSD_{distal}$). The incoming waveform can be compared against the template; the dashed lines indicate where the waveform and template are split into three segments.

In an embodiment, the NRMSD value is used as a weight to calculate the rotation at each joint. For example:

$R_{proximal} = NRMSD_{proximal} * Angle\_Maximum_{proximal}$.

$R_{middle} = NRMSD_{middle} * Angle\_Maximum_{middle}$.

$R_{distal} = NRMSD_{distal} * Angle\_Maximum_{distal}$.

Figure 11C:
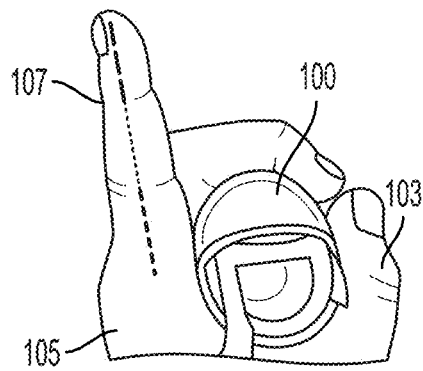
FIG. 11C shows an illustration of index finger position and motion, and templates and waveforms associated with the index finger position and motion.

Turning now to FIG. 11C, in an embodiment, because the NRMSD is always positive, the integral of the template and incoming waveform may be calculated to determine when the index finger 107 is extended. The integral of the incoming waveform and the template will be less than zero. In an embodiment:

$R_{proximal} = NRMSD_{proximal} * Angle\_Extension_{proximal}$.

$R_{middle} = NRMSD_{middle} * Angle\_Extension_{middle}$.

$R_{distal} = NRMSD_{distal} * Angle\_Extension_{distal}$.

Implementation Architecture

In an embodiment, a library is written so that input from a controller 100 (or other device) may be processed in different ways by different, modular components of the library, but the output is available to the library's clients in a synchronized way. Thus, in an embodiment, when data is made available from the library, the data processed by each module should be from the same input frame, and each processing module should have seen the same input stream as all of the others. Further, in an embodiment, data representing different frames are considered.

Figure 12:
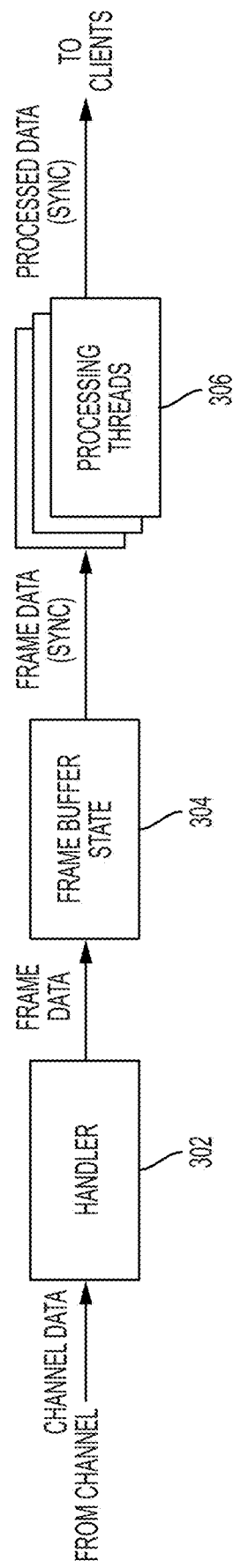
FIG. 12 shows the blocks of an overall library pipeline in accordance with one embodiment of the invention.

Turning to FIG. 12, an overall library pipeline is shown in accordance with one embodiment of the invention. Parts of the pipeline labelled with (sync) involve synchronization to ensure that the above goal is completed. In an embodiment, each (sync) interaction uses a buffering object (e.g., RWSwapBuffer) to meet that goal.

In an embodiment, the buffer can hold onto one object that multiple readers can access, can give an object for write access to a single client, and can store one object that is currently not in use and waiting to be read. This allows for concurrent read-write access, and works well for streaming data sources.

In an embodiment, output data will be dropped and will not be seen by any client if (and only if) the writer finishes writing new data while any readers are currently holding an older data structure. Dropping output data as described mitigates the propagation of old data through the system and helps maintain low end-to-end latency.

In an embodiment, each of the components represented by blocks in FIG. 12, Handler 302, FrameBufferState 304 and ProcessingThread 306 are implemented as a module, each with its own lifecycle and its own running thread. This architecture allows for configurable startup/teardown of individual components, to adhere to a strong lifecycle, and to enable concurrency within the pipeline. In an embodiment, each of these components is implemented as a subclass of the GenericModule class. This creates a blueprint for handling the lifecycle of each component, leaving functions to be implemented by subclasses to define the behavior of each subclass.

The functions expected to be overridden in the GenericModule, and their intended purpose are as follows:
- init( )—allocating globally accessible resources and making any preparations needed to run at all
- startLoop( )—allocating thread-specific resources and making any preparations needed to start a thread session
- finishLoop( )—deallocating thread-specific resources and finalizing anything needed to end a thread session
- preStop( )—performing any necessary command-related setup after requesting the thread to stop, but before blocking on the thread to join
- postStop( )—performing any command-related teardown after the thread has joined
- loop( )—main work function, called repeatedly on the thread until the module is requested to stop In an embodiment, functions init( ) startLoop( ) and loop( ) can return whether or not an error occurred during their execution, returning false if an error occurred. An error in the call to init( ) prevents the thread from being started, and a failure in startLoop( ) or loop( ) will cause the thread to terminate.

In an embodiment, finishLoop( ) executes every time a thread exits, and is meant to clean up thread/session resources and represents a change of thread state, while preStop( ) and postStop( ) handle any processing necessary for a stop request, and represents the beginning and end of a command.

In an embodiment, unless the default function implementations inside of GenericModule are overridden, startLoop( ), finishLoop( ), preStop( ) and postStop( ) are guaranteed to only run once during the module's lifetime.

In an embodiment, the functions inside of GenericModule, or in any of its subclasses, may not block forever without waiting on exit signals (mStopRequested or shouldStop( )). In an embodiment, any function overridden by a subclass of GenericModule should call its parent class' function, as there may be additional implementations in the class hierarchy that expect to be chained for proper functionality.

Figure 13:
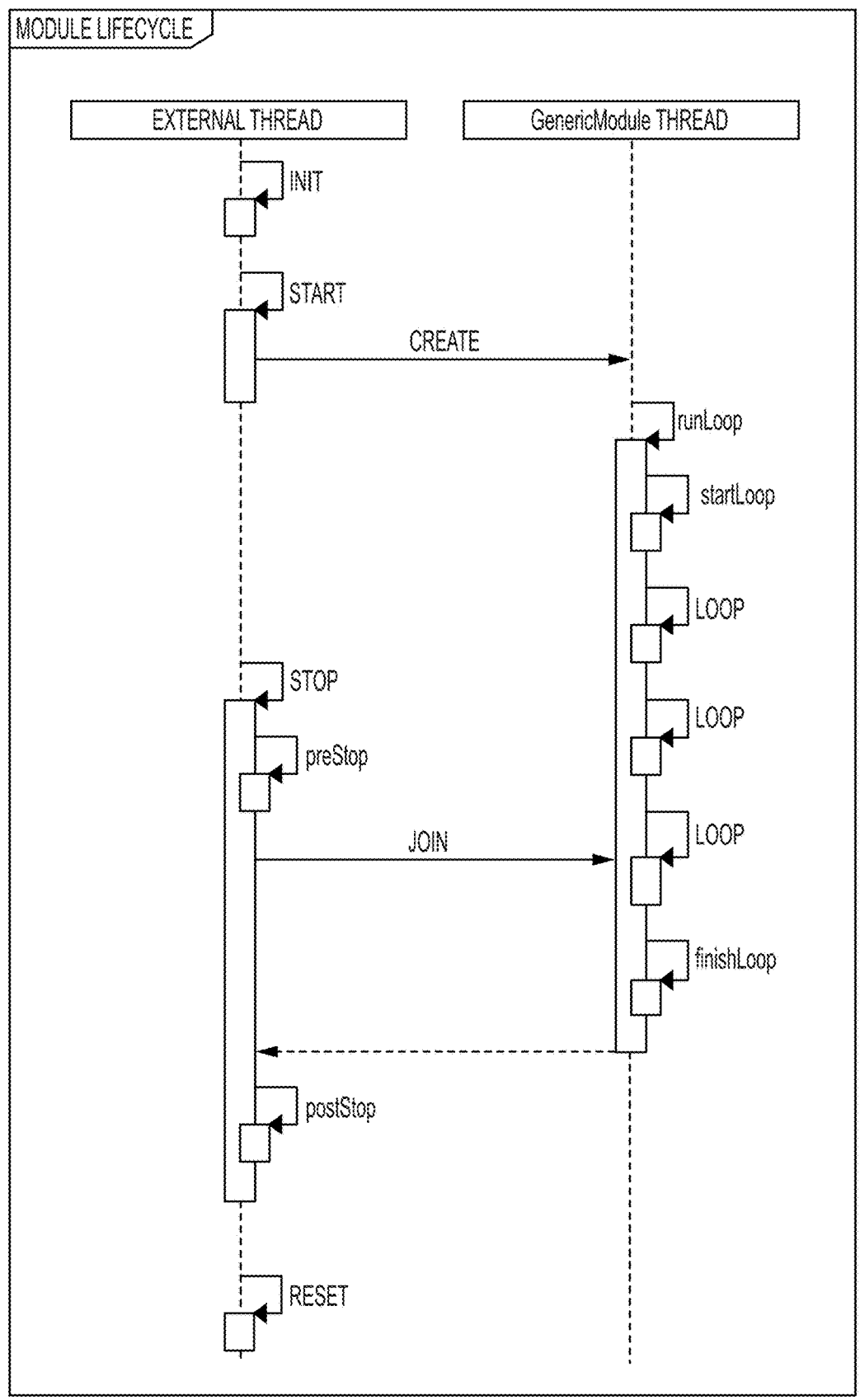
FIG. 13 shows an illustration of an expected order of calls and the interaction between an external thread and a GenericModule's thread, assuming all calls to startLoop( ) and loop( ) are successful, in accordance with one embodiment of the invention.
Figure 14:
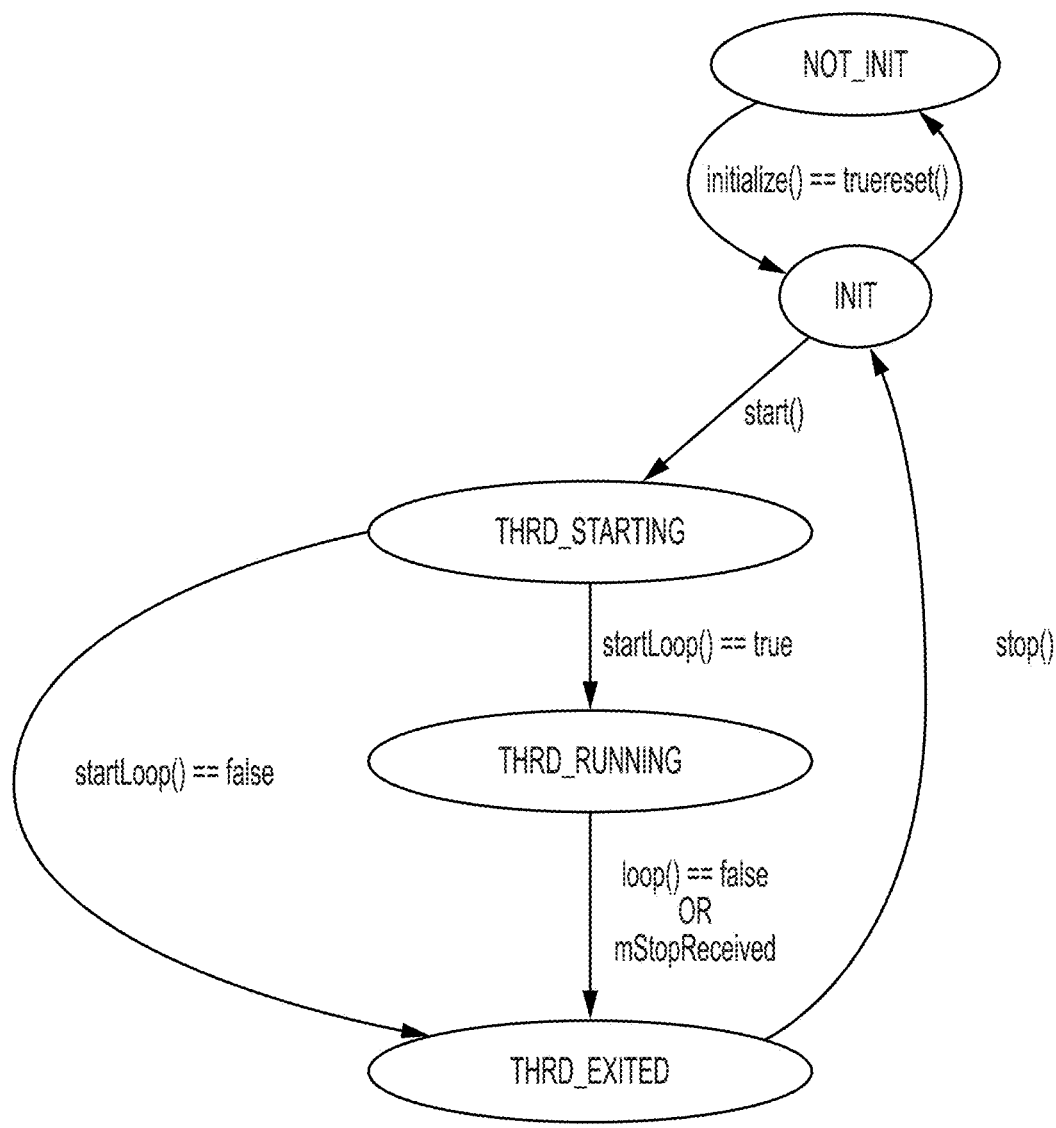
FIG. 14 shows an illustration of a state machine shows the list of states supported by a GenericModule, as well as their transition conditions, in accordance with one embodiment of the invention.

Turning now to FIG. 13 an illustration shows the expected order of calls and the interaction between an external thread and a GenericModule's thread, assuming all calls to startLoop( ) and loop( ) are successful. Turning briefly to FIG. 14, an illustration of a state machine shows the list of states supported by a GenericModule, as well as their transition conditions. And turning briefly to FIG. 15, an illustration shows the expected life-cycle of a GenericModule in the case where the thread is created successfully, and no errors occur during startLoop( ) or loop( ).

In an embodiment the Handler classes receives data from a channel (e.g., UDP datagrams through a socket or read packets from a .pcap formatted file), format the data into frames to be consumed by the other components of the library, and make the frame data available for synchronization and consumption for the rest of the library.

In an embodiment, the frames passed between the GenericHandler and the ProcessingThreads 306 may be sized differently depending on the type of sensor being used in the controller 100 to which the library is connected. This information may be abstracted using an interface class (IGenericFMTFrame) for the frame that gets templated with configuration-specific parameters about the controller 100 being used at the time. In an embodiment, the IGenericF-MTFrame class exposes information about the controller 100 without needing to know which template parameters were being used in advance. The Handler classes may treat the frame as an output buffer, and, in an embodiment, do not need to provide configuration-specific parameters.

In an embodiment, the Handler classes write information out (e.g., to the frame) in the same data order as it appears over the wire from the controller 100. In an embodiment, a channel-major order is employed. In an embodiment, an output buffer can be provided with a fixed bit width (e.g., 32 bits or 64 bits) that is always bin- or channel-major, and fix bins and channels to rows or columns.

In an embodiment, the FrameBufferState 304 implements synchronization of the Handler's output data for all the ProcessingThreads 306 in the library, as well as the synchronization of the ProcessingThreads' output data and the API clients.

In an embodiment, the FrameBufferState 304 blocks all processing threads until a frame from the Handler is available, waiting until all processing threads have finished with the currently held frame. Once unblocked, all of the output data from the processing threads is committed and available for consumption by the API client(s). Thereafter, the process may repeat, with FrameBufferState 304 blocking all processing threads until a frame is available.

In an embodiment, FrameBufferState 304 is a module owned by the Handler. In another embodiment, FrameBufferState 304 is a module that is present for the lifetime of the library. This latter design choice may allow for a stronger, more flexible startup and teardown procedure, and well-defined rules for module state transitions. In an embodiment, FrameBufferState 304 can allow processing threads to add and remove themselves, receiving an ID that associates that processing thread with its processing/synchronization state (data waiting for processing, etc.) inside the FrameBufferState 304.

In an embodiment, the FrameBufferState 304 allows for processing threads to register and unregister themselves from receiving new frames from the input stream at will while the library is running. Allowing this registration may expand the number of states needed to keep track of the library and determine how things need to interact. In an embodiment, to keep updated with the state of the library's handler and each processing thread, the FrameBufferState 304 contains a message queue that allows other modules to notify it when they change their state. Thus, in an embodiment, there are six bitsets inside the FrameBufferState 304:
- mProcIdBitset: tracks IDs given to registered processing threads
- mProcEnabledBitset: tracks processing threads that are running and ready to process data (Set and reset through changes of state passed through the FrameBufferState's message queue)
- mProcDataBitset: tracks processing threads that are expected to process the frame currently being processed
- mProcDataCommitBitset: tracks processing threads that have data that needs to be committed to become available to the client
- mStartEnabledBitset: tracks processing threads that are expecting to receive data together as a packet (Used to synchronize the first frame between all enabled processing threads when the library starts, ensuring all processing threads receive the same data stream (unless disabled early or enabled late))

mForceReturnBitset: tracks any processing threads that are requested to return and should not block inside any FrameBufferState 304 function In an embodiment, once a processing thread registers with the FrameBufferState 304, it receives an ID that uniquely identifies that processing thread while it is registered (via addProcessingThread( )). In an embodiment, when a process thread unregisters (removeProcessingThread( )), that guarantee is rescinded, and the ID may be given to a new thread. If the same processing thread registers again successfully sometime later, it may receive a new ID with the same guarantee.

In an embodiment, all processing threads must call sendUpdateMessage( ) on their instance of the FrameBufferState 304 to keep the FrameBufferState's internal state up to date. If this does not happen, the processing thread may not receive new data, or it may cause the pipeline to stall, waiting for the thread to process data when it's already exited.

Figure 16A:
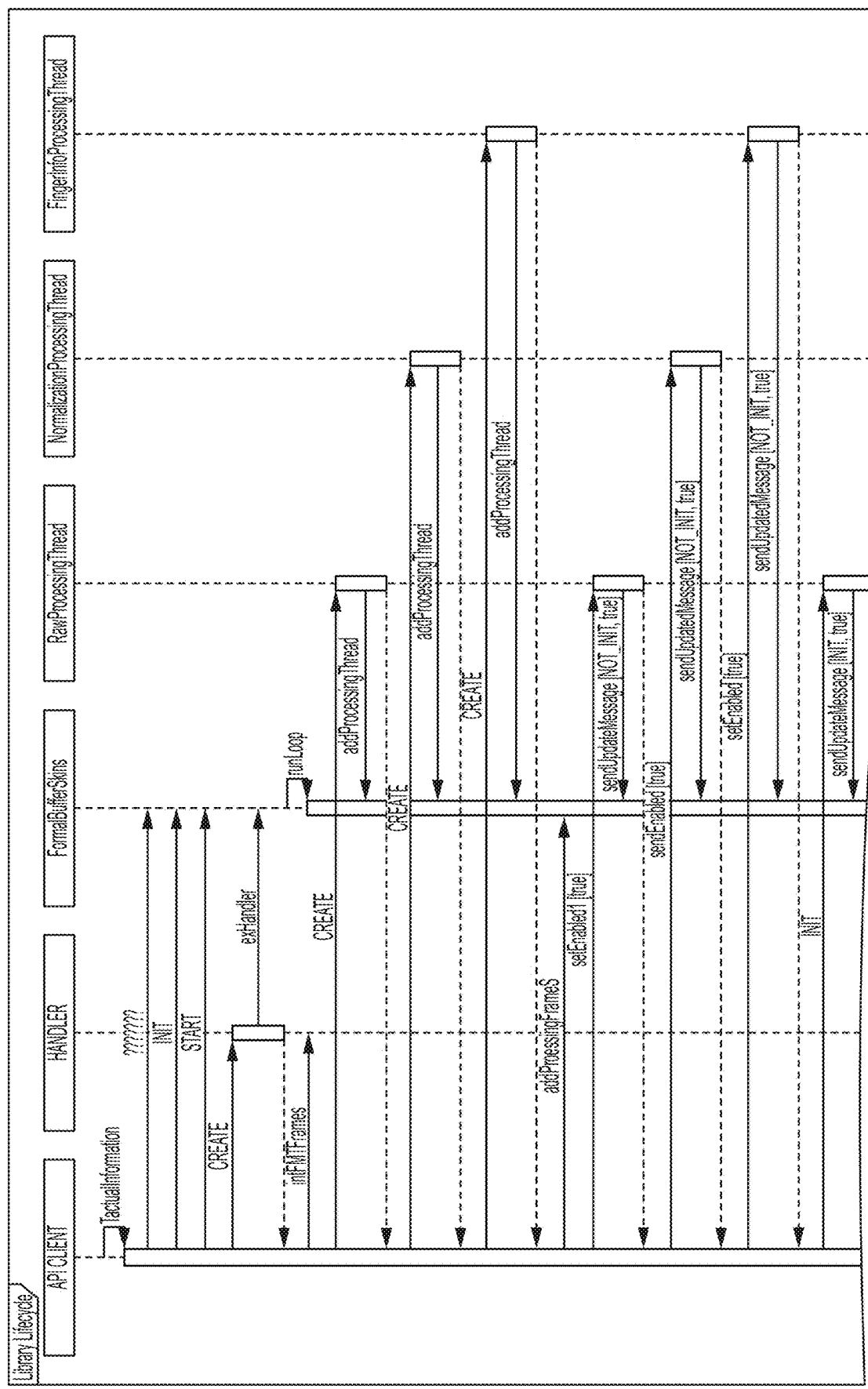
FIG. 16A is a sequence diagram showing the order of calls in an embodiment of the present invention.
Figure 16D:
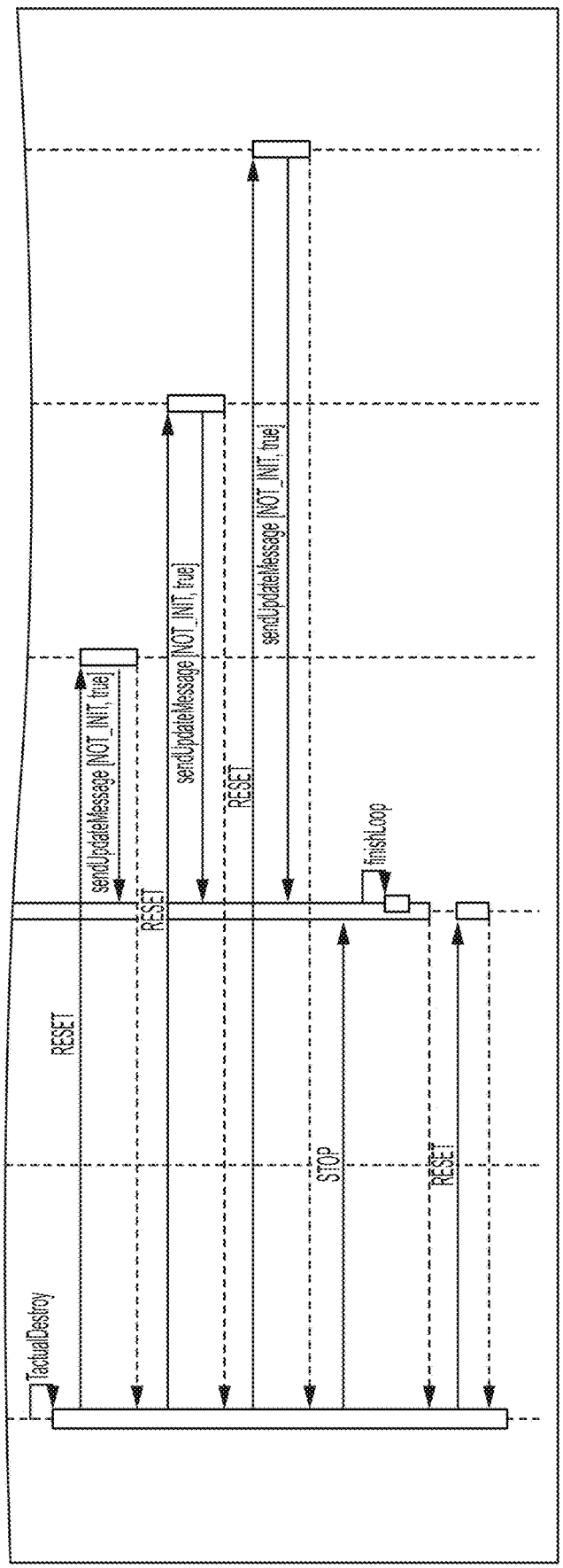
FIG. 16D is a sequence diagram showing the order of calls in an embodiment of the present invention.

Turning to FIG. 16, a sequence diagram is presented showing the order of calls in an embodiment of the present invention.

In an embodiment, the classes of the ProcessingThread 306 are intended to perform arbitrary computation on a stream of frames to be accessed through the library by any client of the API. In an embodiment, the GenericProcessingThread class serves as an interface for any component intended to process frames from the controllers. Thus, in addition to the functions available in GenericModule, the GenericProcessingThread may provide a definition for loop( ) that is suited for processing frame data. In an embodiment, the implementation of loop( ) handles frame acquisition and release calls needed to ensure each processing thread is using the same data outlined earlier. In an embodiment, the loop( ) implementation calls a new virtual function, doProcessing( ), that runs when new frame data has been read and is ready for processing, which is where the bulk of the work done by a specific processing thread is done. In an embodiment, each class of ProcessingThread 306 should inherit from the GenericModule, and follows the lifecycle outlined above.

In an embodiment, the library keeps a set of pointers to each of the processing threads that are created to get access to the data inside of them, make the needed module lifecycle calls to match the state of the library, and expose the module to any requested commands from the library's clients made through the API.

In an embodiment, each processing thread should expose an enable/disable function to allow clients to state whether or not that thread's output is needed or not. In an embodiment, the exposed function may limit unneeded use of CPU and memory by the library. Similarly, in an embodiment, any optional features that the processing thread exposes (e.g. index finger tracking for the FingerInfoProcessingThread) should be able to be toggled on and off, especially if they are computationally expensive and may not always be wanted.

In an embodiment, being a subclass of GenericModule, each ProcessingThread 306 inherits a mutex, which can be used to lock resources as needed. In another embodiment, a thread may use its own locking strategy, so long as nothing sleeps when holding onto the base Module's mutex.

In an embodiment, within the library, there are a set of global data structures storing the parameters of a controller type. In an embodiment, the controller parameters include information for mesh construction and interpretation, as well as board-specific information on the format of the frame data coming out of the controller (e.g. number of bins, number of channels, data width in bits).

In an embodiment, processing threads may be configured with respect to the data they output, and the algorithms they run with. In an embodiment, the configuration may be adapted to controller types, or depend on a parameter of the of the controller, or a parameter of the board running the controller.

Figure 17A:
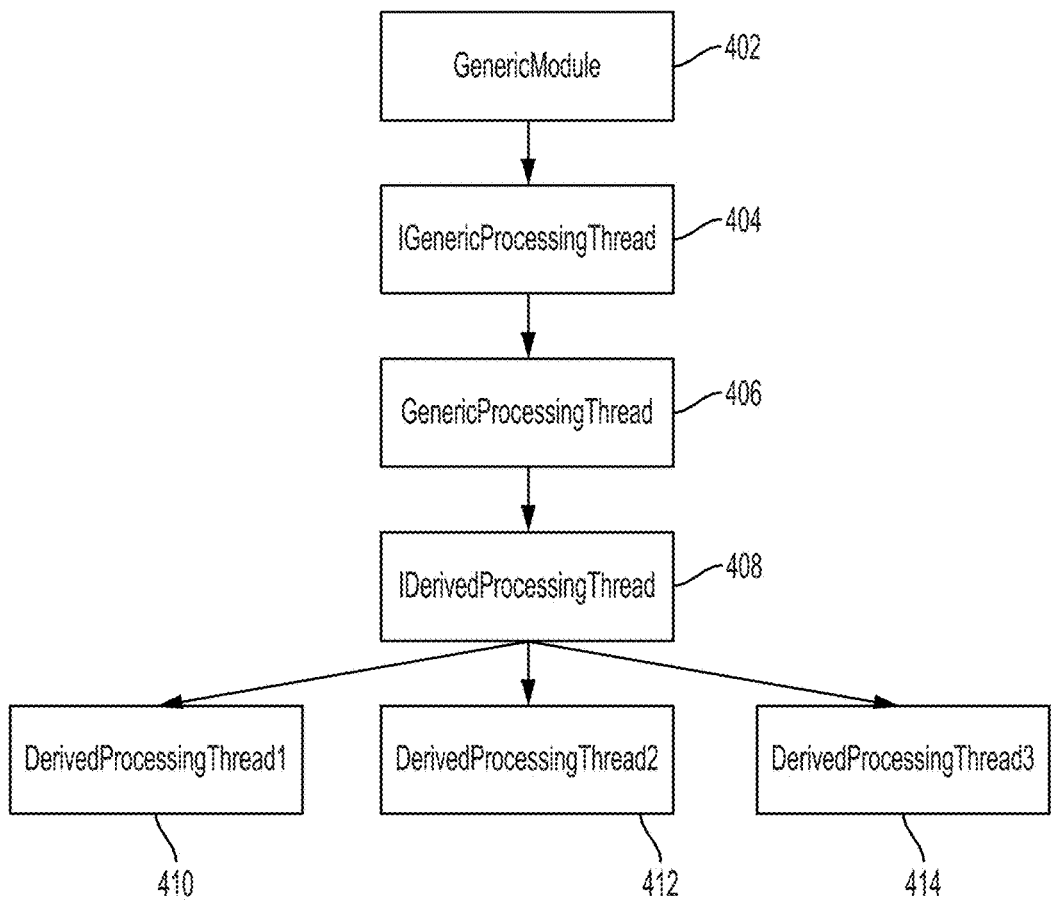
FIG. 17A shows the structure of ProcessingThreads creation in accordance with two different (but non-exclusive) embodiments of the invention.
Figure 17B:
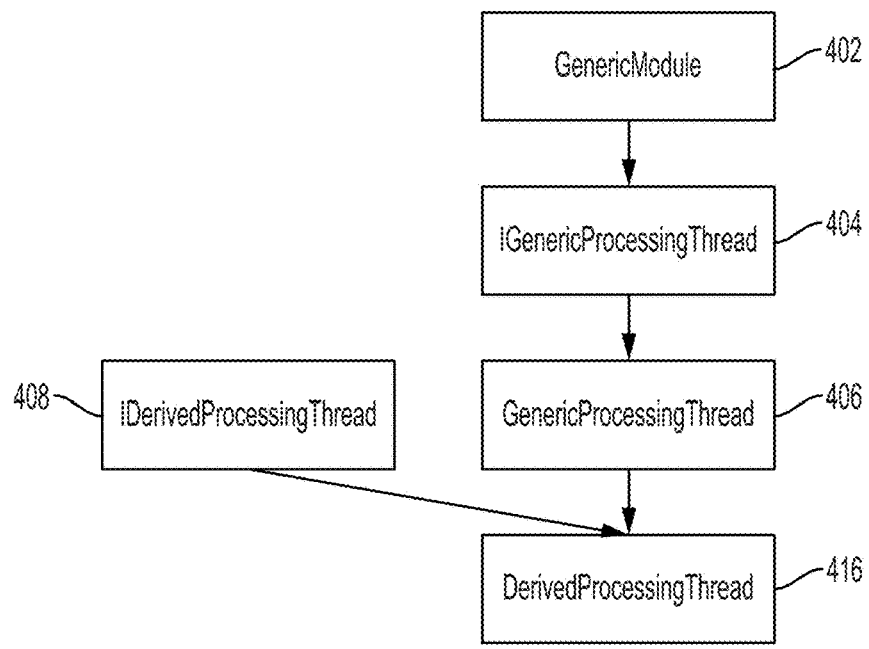
FIG. 17B shows the structure of ProcessingThreads creation in accordance with two different (but non-exclusive) embodiments of the invention.

Turning to FIGS. 17A and 17B, show the structure of two embodiments used to create ProcessingThreads 306 that work differently depending on the controller configuration used. FIG. 17A shows an embodiment having an abstract class for the processing thread that subclasses a GenericProcessingThread that is suitable for supporting multiple configuration-specific algorithms, like the FingerInfoProcessingThread, where the processing depends heavily on the controller type. Shown in FIG. 17A is GenericModule 402, IGenericProcessing Thread 404, GenericProcessing Thread 406, IDerivedProcessing Thread 408, DerivedProcessing Thread 1 410, DerivedProcessing Thread 2 412 and DerivedProcessing Thread 3 414. FIG. 17B shows an embodiment having an independent class used as an interface, which may be useful for abstracting away the datatype used by the concrete processing threads. Shown in FIG. 17B are Generic Module 402, IGenericProcessing Thread 404, GenericProcessing Thread 406, IDerivedProcessing Thread 408 and DerivedProcessing Thread 416. As the GenericProcessingThread 406 accepts the datatype that it outputs as a template parameter, if the datatype in each configuration is templated, then the interface should abstract that datatype through accessor functions. In an embodiment, the methods shown in FIGS. 17A and 17B can be combined to support multiple concrete processing thread implementations with config-specific implementations and datatypes.

Controller Configuration/Calibration

Figure 18:
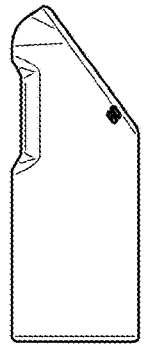
FIG. 18 shows an embodiment of a controller UI, including checkboxes for handedness, index, fingers and thumbpad.

In an embodiment, controller user interface software is provided to permit configuration and/or calibration of the controller 100. Turning to FIG. 18, a controller UI (User Interface) including checkboxes for handedness, index, fingers and thumbpad is provided. Using the checkboxes, a user could configure the controller 100 to provide or preclude new data for the identified features of the controller 100.

Figure 19:
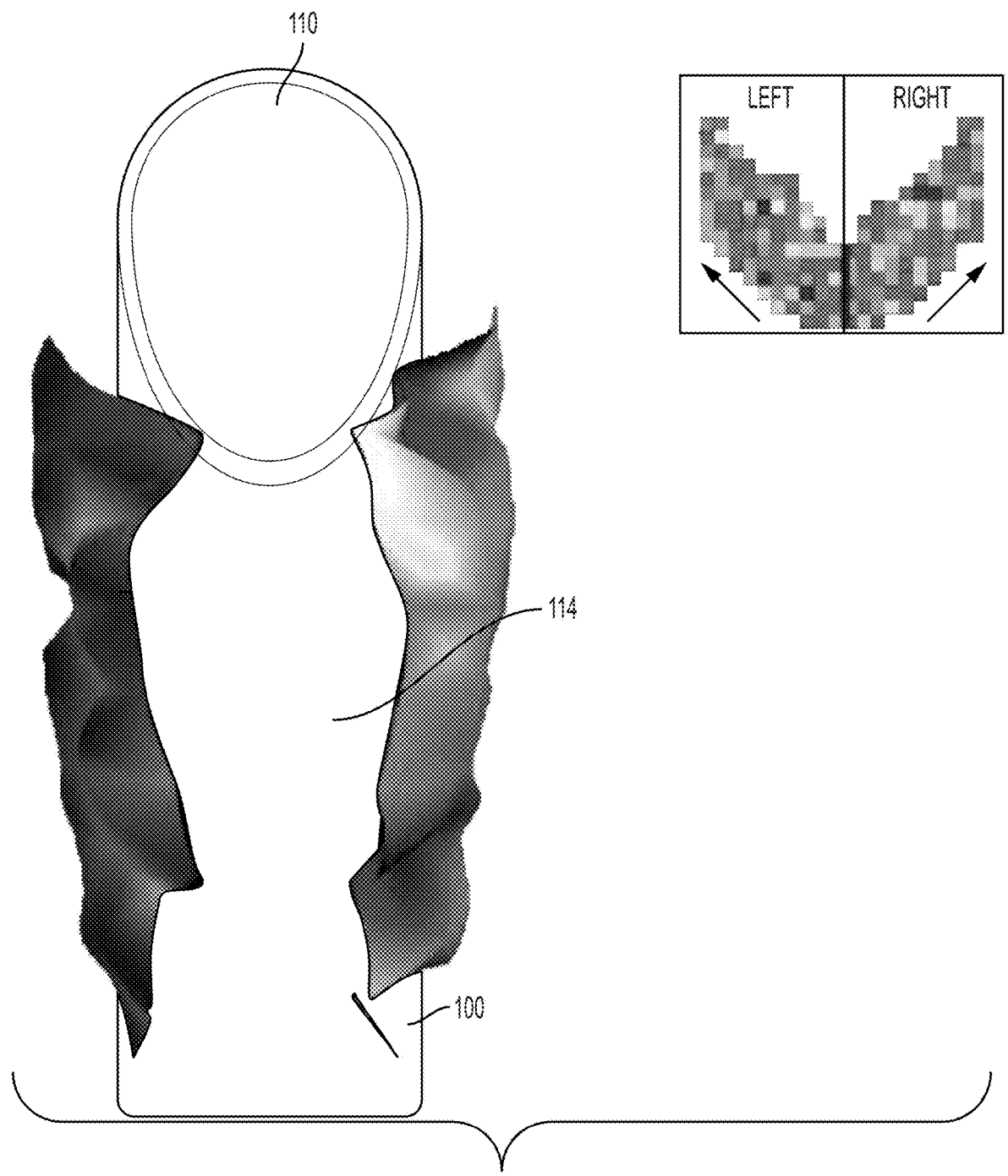
FIG. 19 is a visualization of an uncalibrated heatmap around the body of a controller.
Figure 20:
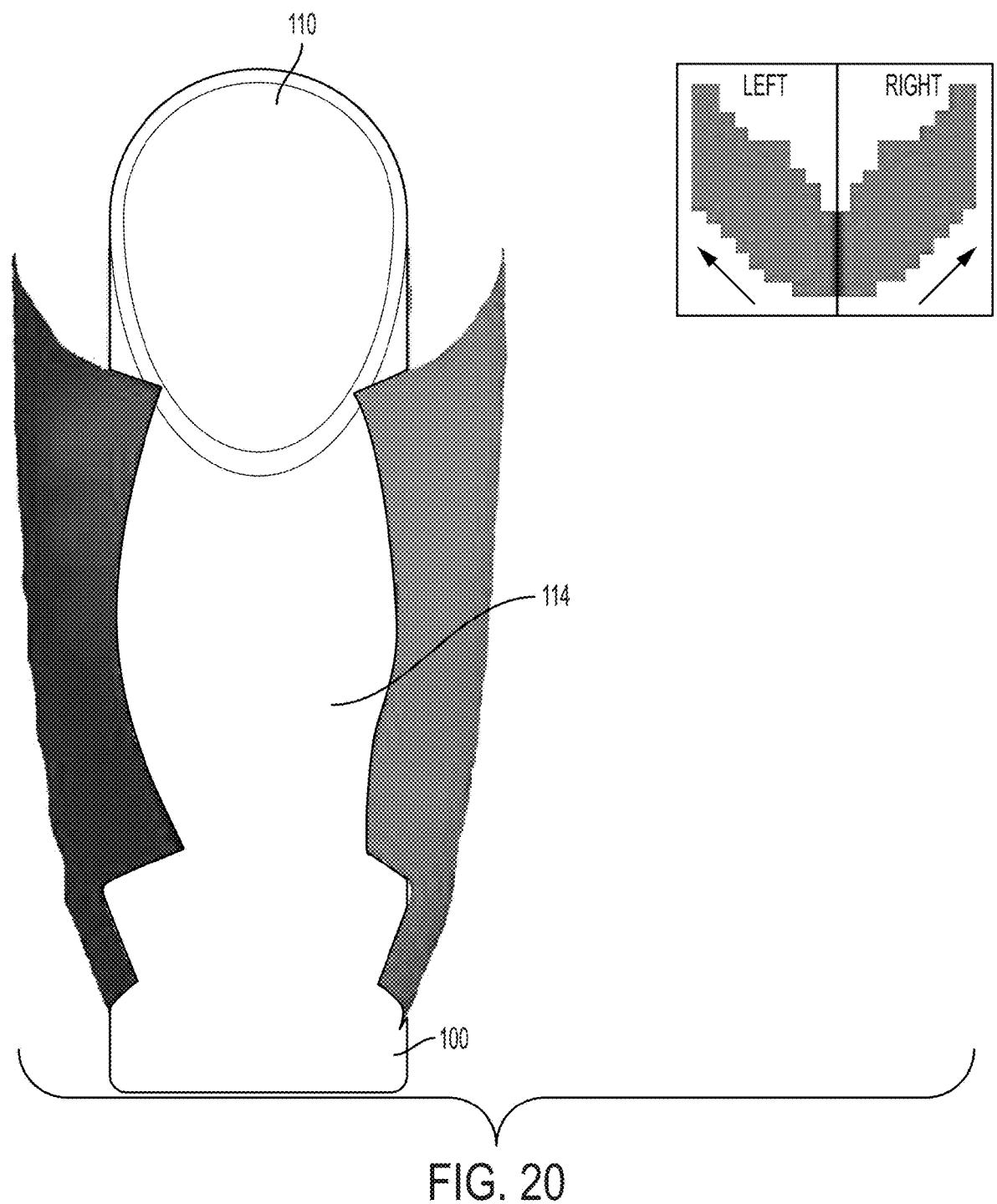
FIG. 20 is a visualization of a heatmap around the body of a controller that is being gripped so as to substantially cover its surface.
Figure 21:
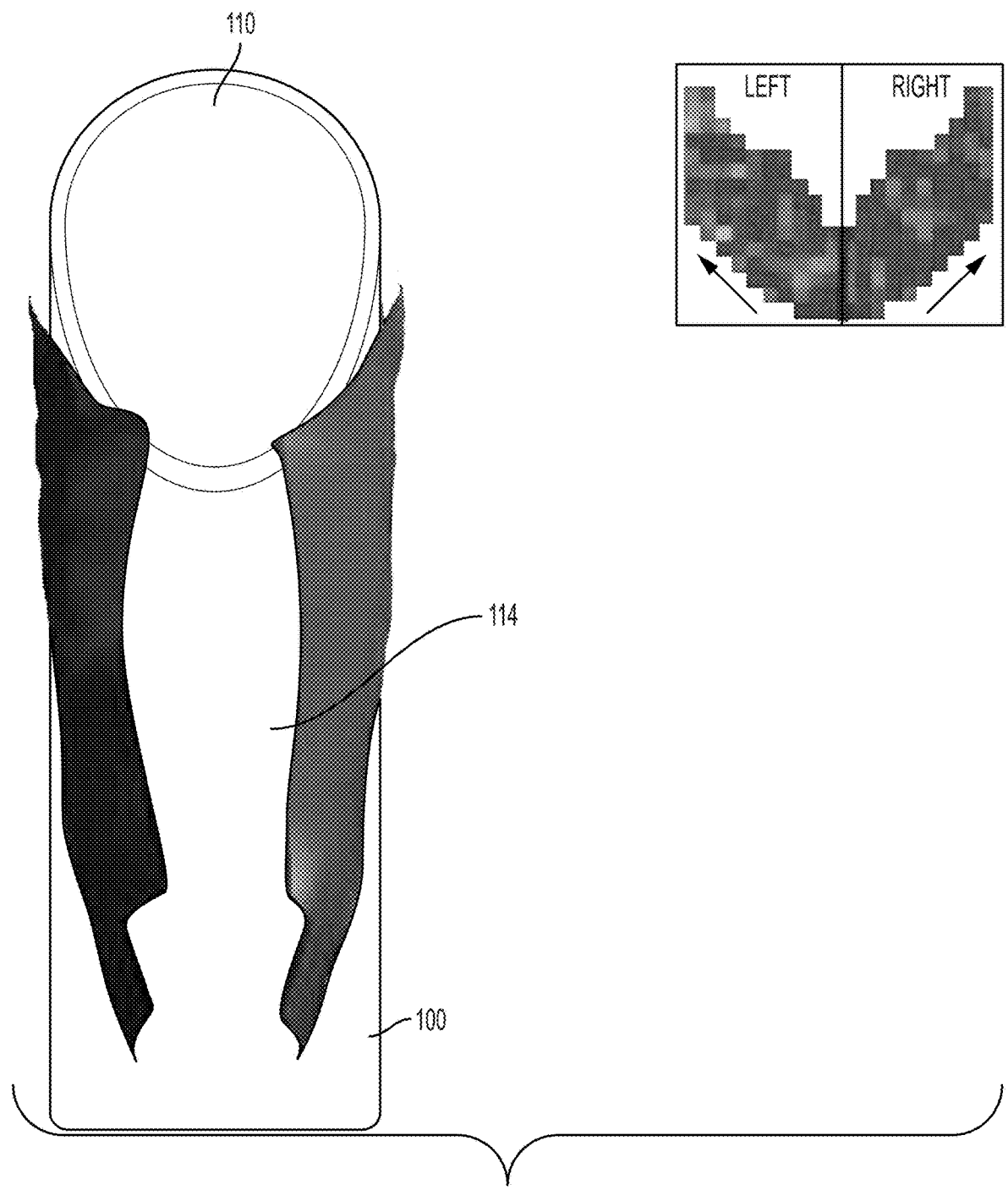
FIG. 21 is a visualization of a heatmap around the body of a controller that is not being gripped.
Figure 22:
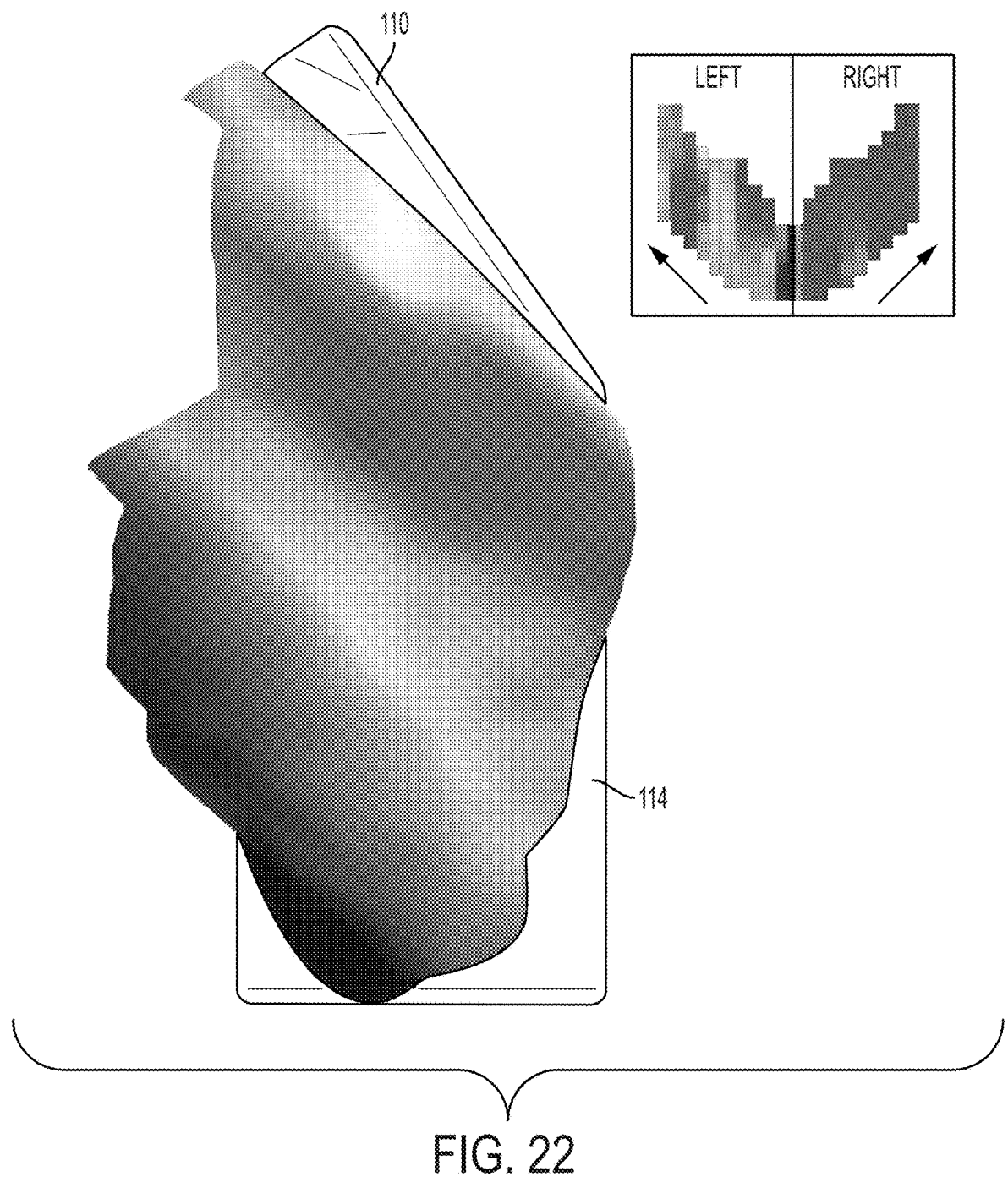
FIG. 22 is a visualization of a heatmap around the body of a calibrated controller held in the right hand.

In an embodiment, software for calibrating the controller 100, and the visualization of a heatmap is provided. Turning to FIG. 19, observed colors may range from blue to red showing the capacitive coupling intensity (blue being the weakest, and red being the strongest). In an embodiment, prior to calibration of the controller 100, a visualized heatmap may appear noisy as seen in FIG. 19. In an embodiment, to calibrate the controller 100 and thus have a more accurate heatmap, a user may grip the controller 100 with both hands to ensure the controller 100 is substantially covered, and then let go of the controller 100. FIG. 20 shows a visualization of a heatmap from a controller 100 grasped with both hands, and FIG. 21 shows a visualization of a heatmap from a controller 100 that has been released, in each case as described. The process of grasping and releasing permits the controller 100 and thus the heatmap visualization to be calibrated. Turning briefly to FIG. 22, the visualization for a calibrated controller 100 held in the right hand is shown.

Figure 23:
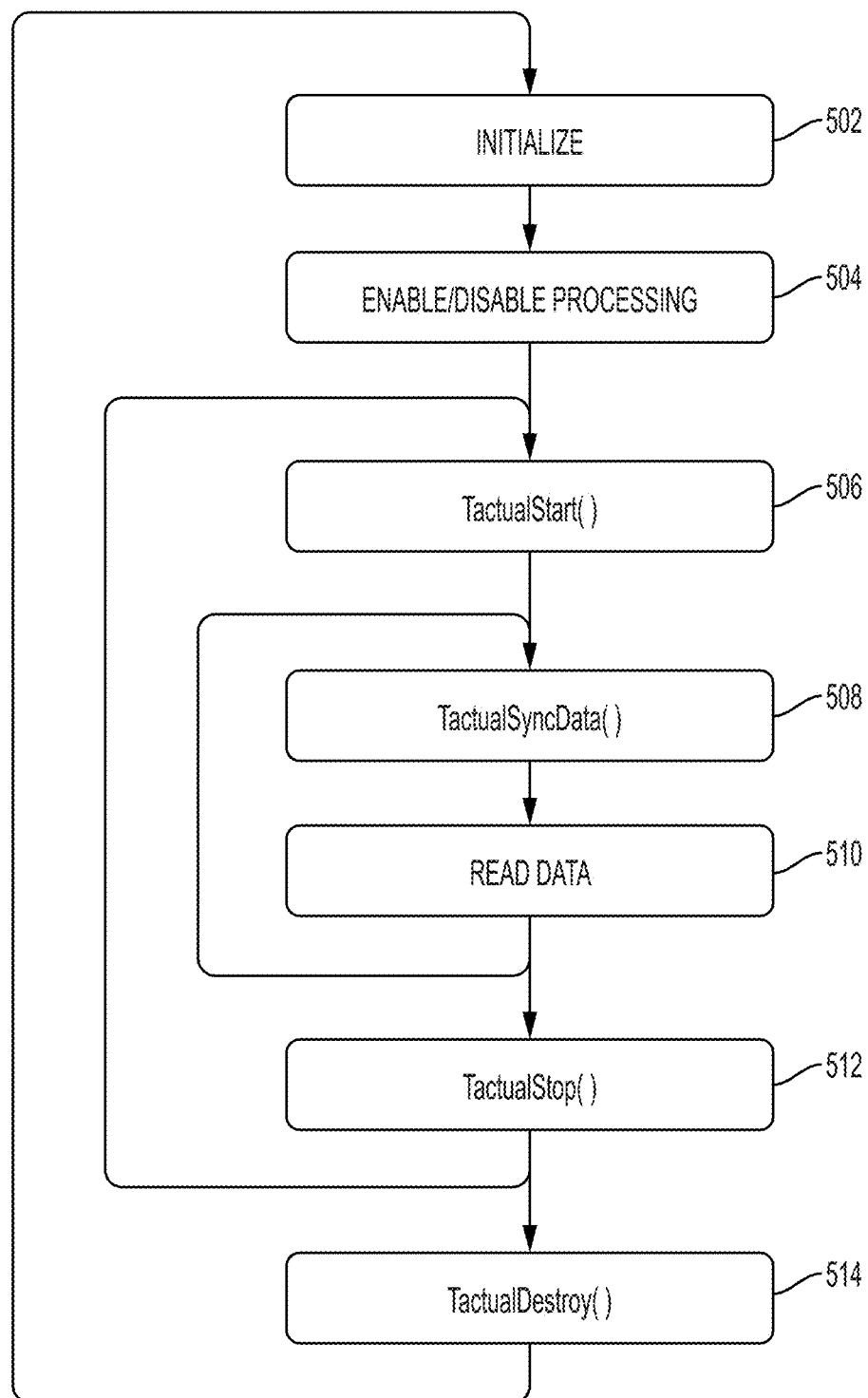
FIG. 23 shows a basic lifecycle of the library in accordance with one embodiment of the invention.

Turning to FIG. 23, a basic life-cycle of the library is shown. In an embodiment, before data can be read from the library, in step 502, the library must first be initialized and started. In an embodiment, to initialize the library, an initialization call (e.g., TactualInitializeWithLiveStream( ))

must return successfully. In an embodiment, once initialized, the library can be started and stopped multiple times while keeping the same setup. Thus, for example, if the library was initialized to read a live data stream from a controller, each time the library is started and stopped, it will still be set up to stream in data from the controller 100 until it is reinitialized in a different setup.

In an embodiment, before the library is started, in step 504, any processing features that generate needed data must be enabled to ensure those features are processed. In an embodiment, in step 504, features that generate unneeded data should be disabled. Disabling features that generate unneeded data will mitigate unnecessary computation. In an embodiment, by default, all processing features start off disabled, and can be enabled (or re-disabled) by calls (e.g., TactualEnableNormalizedIntensity( )) which can be made after the library is started.

In an embodiment, in step 506, to start the processing features inside the library, a start function (e.g., TactualStart( )) must be called; if it returns successfully, the library should be setup to process any data from the source it was initialized to read from.

In an embodiment, in step 508, a function is called to read the latest data available from the library, (e.g., TactualSyncData( )). In an embodiment, in step 510, the function called to read the latest data available from the library updates the accessible data to the newest available processed data, and then call data access functions to read the data available from the library. In an embodiment, another call (e.g., TactualHasNewData( )=TRUE) is provided to ensure that there is new data available to read the latest data (e.g., after a TactualSyncData( ) call). In an embodiment, the library will only produce data from processing features that were enabled before the last start call (e.g., TactualStart( )) was made. In an embodiment, in step 512, a stop call (e.g., TactualStop( )) is provided to stop the processing features in the library. In an embodiment, once stopped, the processing features can be restarted on a subsequent call to the start function. In an embodiment, in step 514, a resource deallocation function is also available in the library (e.g., TactualDestroy( )). When the deallocation function is successfully called, resources are deallocated, and the library requires another reinitialization call to reinitialize.

In an embodiment, setup threads would permit, among other things, enabling the raw heatmap, enabling normalized intensity, and enabling finger position, and processing thread control functions may include enabling handedness tracking, enabling index finger tracking, enabling middle/ring/pinky finger tracking and enabling thumb finger tracking. In an embodiment, data be accessed, for example, but getting normalized intensity heatmap data (which may be masked), and getting hand skeleton data.

Hand Skeleton Data

Figure 24:
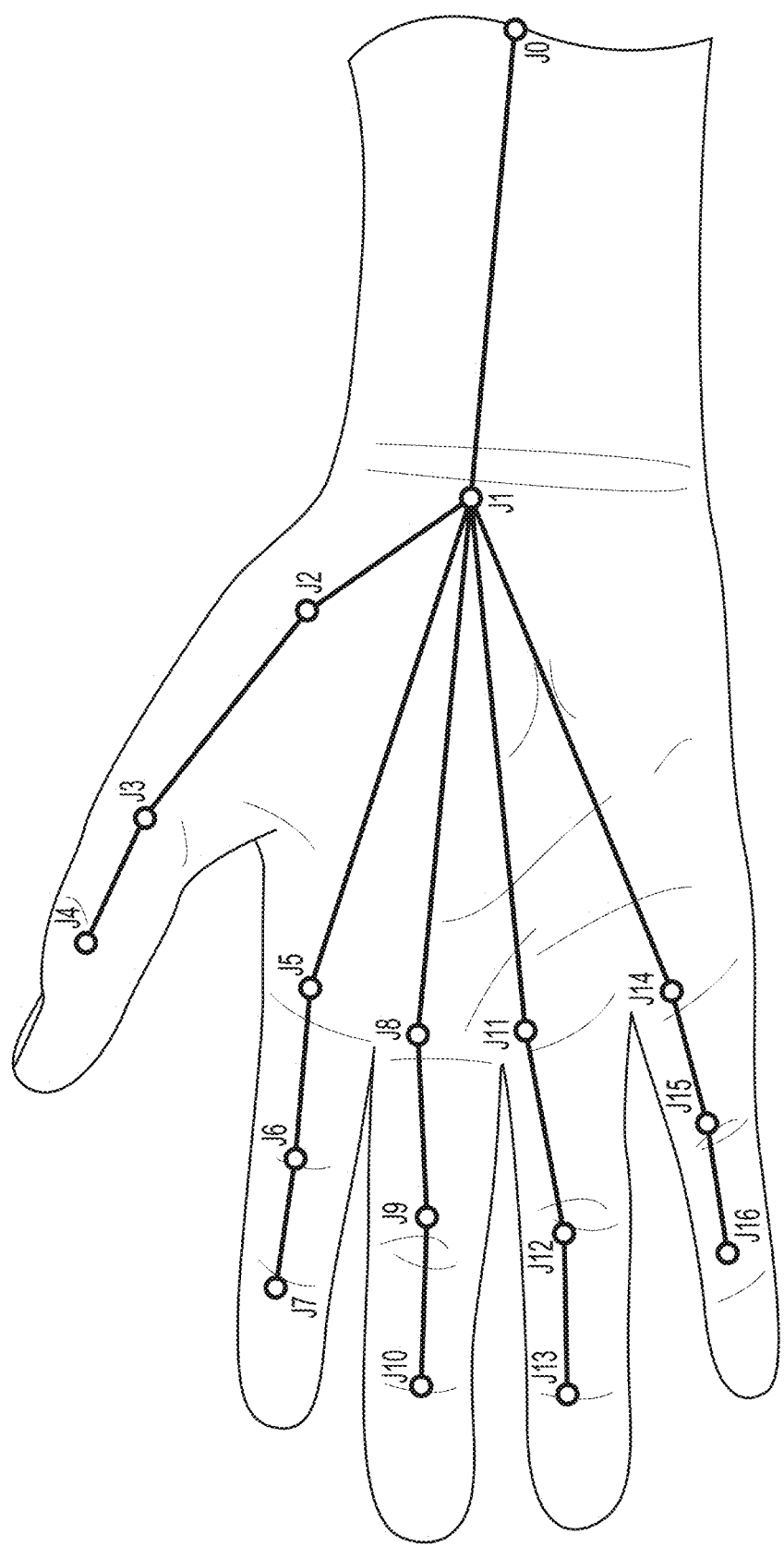
FIG. 24 shows an illustration of the human hand and a series of joints and bones in the hand that are relevant to the controller, in accordance with one embodiment of the invention.

FIG. 24 contains an illustration of the human hand and a series of joints and bones in the hand that are relevant to the controller. The illustration, and the model used, may be simplified to the extent that some parts (e.g., the carpals) are or may not be relevant to the models produced by the controller 100. Specifically, FIG. 24 shows each bone's corresponding position (or the position of a simplification) on a human hand (light blue dots), its hierarchy with respect to other bones (dark blue lines), and identifies bones with names. In an embodiment, the node in the forearm is the root node and has no parent.

In an embodiment, hand skeleton data is stored in packed 32-bit float arrays, with each bone being treated as a 7-tuple of a (x,y,z) position vector with all quantities in metres and a (qx,qy,qz,qw) rotation quaternion, with each tuple being treated as a local transformation with respect to its parent (i.e., translation done in local axes, taking into account any rotation done by its ancestors). It will be apparent to one of skill in the art that many other data structures could be used to represent the hand, especially in view of the sensitivity, capabilities and degrees of freedom permitted by the controller 100.

Accordingly, FIG. 25 shows an embodiment of a table of the representation of skeleton data described above. The table in FIG. 25 represents one embodiment of the table as it exists in the memory of a computing device. The name of each bone in FIG. 25 corresponds with the names from FIG. 24.

FIG. 26 shows an embodiment of a data structure that can be used to represent a user's finger information. In accordance with an embodiment, the data structure may represent a variety of information concerning the position and orientation of the user's fingers and/or hand. In an embodiment, the data structure represents user's finger information using the following:

flags is a bitset;

indexPresence, middlePresence, ringPresence, and pinkyPresence each represent values indicative of the presence of a finger near the controller 100—in an embodiment, the values are normalized floats between 0 and 1, where a value of 0 represents the finger being fully extended away from the controller 100, and a value of 1 represents the finger being fully contracted and touching the controller 100;

indexX and indexY represent a position on the trigger—in an embodiment they are Cartesians where an x value of −0.5 is at the very left of the trigger and a value of 0.5 is at the very right of the trigger; similarly, a y value of −0.5 is at the bottom of the trigger, and a value of 0.5 is at the top—in an embodiment, if either value is set to −1, this function would be unsupported by the controller 100;

thumbX and thumbY represent a position on the thumbpad—in an embodiment, they are Cartesians where an x value of −0.5 is at the very left of the thumbpad and a value of 0.5 is at the very right of the thumbpad; similarly, a y value of −0.5 is at the bottom of the thumbpad, and a value of 0.5 is at the top;

thumbDistance represents the distance from the controller 100—in an embodiment, a value of 0 indicates contact with the controller 100, a value of 1 indicates that the thumb 103 is not near the controller, and a value between 0 and 1 indicates that the thumb 103 is hovering some distance away from the controller 100;

timestamp represents the time of the sensor state given in this structure—in an embodiment, the timestamp can be expressed in e.g., microseconds;

frameNum is an indicator of when this data was relevant, for recorded data sessions, this may represent position within a set of recorded frames, and for live stream sessions, this may represent an increasing number for each sensor frame received;

skeletonPoses representing the position and rotation of each bone in the hand skeleton—in an embodiment, is an array of floats where each bone is given as a 7-tuple of floats representing an (x,y,z) position vector and (qx,qy,qz,qw) rotation quaternion;

localScale reflects scaling expected to be performed on components of the hand skeleton—in an embodiment, it is an array of floats given as a 3-tuple of (x,y,z) scalars;

handedness represents which hand is currently holding the controller—in an embodiment, handedness has an integer value between 0-2, where 0 represents no hands holding the controller, 1 represents the left hand holding the controller, and 2 represents the right hand holding the controller.

FIGS. 27 and 28 are tables reflecting an embodiment of skeletonPoses for an exemplary right hand, FIG. 27 having an open palm, and FIG. 28, grasping. Each bone is reflected on a separate row, and the seven tuple represents an x,y,z position vector and a qx, qy, qz, qw rotation quaternion. Positions (x,y,z) are in meters. The axes for each bone takes into account any rotation done by any of the bone's ancestors (refer to FIG. 24 for a depiction of each bone's position on a human hand and their hierarchy). All translation and rotation is relative to a bone's parent. Exemplary quantities are shown only to five decimal places.

In an embodiment, information acquired from one or more sensor patterns on a controller 100 can provide the basis for providing a model of the user's fingers, hands and wrists in 3D with low latency. The low latency delivery of skeletal models may permit VR/AR system to provide realtime renditions of the user's hand. Moreover, the skeletal data presented herein allows application and operating system software to have information from which not only hover, contact, grip, pressure and gesture on a touch-sensitive object can be identified, but it further provides the hand position and orientation, from which gestural intent may be more easily derived.

The present systems are described above with reference to block diagrams and operational illustrations of controllers and other objects sensitive to hover, contact and pressure using FMT or FMT-like systems. It is understood that each block of the block diagrams or operational illustrations, and combinations of blocks in the block diagrams or operational illustrations, may be implemented by means of analog or digital hardware and computer program instructions. Computer program instructions may be provided to a processor of a general purpose computer, special purpose computer, ASIC, or other programmable data processing apparatus, such that the instructions, which execute via a processor of a computer or other programmable data processing apparatus, implements the functions/acts specified in the block diagrams or operational block or blocks.

Except as expressly limited by the discussion above, in some alternate implementations, the functions/acts noted in the blocks may occur out of the order noted in the operational illustrations. For example, the order of execution if blocks shown in succession may in fact be executed concurrently or substantially concurrently or, where practical, any blocks may be executed in a different order with respect to the others, depending upon the functionality/acts involved.

While the invention has been particularly shown and described with reference to a preferred embodiment thereof, it will be understood by those skilled in the art that various changes in form and details may be made therein without departing from the spirit and scope of the invention.

The invention claimed is:

1. A controller, comprising:
   controller body;
   a first plurality of conductors and a second plurality of conductors, the first and second plurality of conductors adapted so that a touch event will cause a change in coupling between at least one of the first plurality of conductors and at least one of the second plurality of conductors;
   signal generator adapted to emit a plurality of frequency orthogonal signals on each of the separate ones of each of the first or second pluralities of conductors;
   signal receiver adapted to receive a frame during an integration period by simultaneously receiving signals present on the separate ones of the first or second plurality of conductors to which it is operatively connected;
   a strap connected to the controller body, wherein the strap has a signal injector operably connected thereto, wherein the signal injector is operably connected to the signal generator and adapted to have at least one of the emitted plurality of frequency orthogonal signals present thereon; and
   signal processor adapted to generate heatmaps reflecting touch events proximate to the controller; each heatmap based, at least in part, on a frame received during an integration period.

2. The controller of claim 1, wherein the strap is adapted to contact a hand of a user of the controller when the controller is being held.

3. The controller of claim 2, wherein the strap is adapted to contact a back of the hand of the user when the controller is being held.

4. The controller of claim 1, wherein the signal injector is one of a plurality of signal injectors located on the strap.

5. The controller of claim 1, wherein the processor is adapted to reconstruct a position of each finger of a hand located proximate to the controller using the generated heatmaps.

6. The controller of claim 5, wherein the processor is adapted to reconstruct the position of a finger when the finger is located at a distance from a surface of the controller.

7. The controller of claim 1, wherein the processor is adapted to reconstruct buttons on the controller using the generated heatmaps.

8. The controller of claim 1, wherein the processor is adapted to reconstruct a track pad using the generated heatmaps.

9. The controller of claim 1, wherein the processor is adapted to reconstruct a static pose of a hand using the generated heatmaps.

10. A controller, comprising:
    a controller body having a first plurality of conductors and a second plurality of conductors, wherein at least one of the first plurality of conductors and the second plurality of conductors is adapted to have frequency orthogonal signals transmitted thereon; the first and second plurality of conductors adapted so that a touch event will cause a change in coupling between at least one of the first plurality of conductors and at least one of the second plurality of conductors;
    a signal injector adapted to transmit an injection signal proximate to a hand holding the controller, and
    a signal processor adapted to generate heatmaps using the injection signal and the frequency orthogonal signals, wherein the processor is adapted to reconstruct a position of each finger of a hand located proximate to the controller using the generated heatmaps.

11. The controller of claim 10, wherein the signal injector is located on a strap connected to the controller body.

12. The controller of claim 11, wherein the strap is adapted to contact a hand of a user of the controller when the controller is being held.

13. The controller of claim 12, wherein the strap is adapted to contact a back of the hand of the user when the controller is being held.

14. The controller of claim 10, wherein the injection signal is frequency orthogonal to each other transmitted frequency orthogonal signal.

15. The controller of claim 10, wherein the processor is adapted to reconstruct the position of a finger when the finger is located at a distance from a surface of the controller.

16. The controller of claim 10, wherein the processor is adapted to reconstruct buttons on the controller using the generated heatmaps.

17. The controller of claim 10, wherein the processor is adapted to reconstruct a track pad using the generated heatmaps.

18. The controller of claim 10, wherein the processor is adapted to reconstruct a static pose of a hand using the generated heatmaps.

19. The controller of claim 10, wherein the signal injector is one of a plurality of signal injectors.

20. The controller of claim 19, wherein the at least one of the plurality of signal injectors is located on a strap connected to the controller body and at least one other of the plurality of signal injectors is in one form selected from the group consisting of: a wristband; a watch; a smart-watch; a mobile phone; a glove; a ring; a stylus; a pocketable object; a seat cushion or other seating pad; a floor mat; an armrest; a desk surface; a belt; a shoe; and a wearable computing device.

* * * * *